US012655963B2

(12) United States Patent
Irons et al.

(10) Patent No.: US 12,655,963 B2
(45) Date of Patent: Jun. 16, 2026

(54) LINEAR LUMINAIRE

(71) Applicant: Elemental LED, Inc., Reno, NV (US)

(72) Inventors: Travis Irons, Reno, NV (US); Robert Green, Reno, NV (US); Andrew Lassen, Reno, NV (US); Nathan Davey, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/868,130

(22) PCT Filed: Jun. 29, 2023

(86) PCT No.: PCT/US2023/069440

§ 371 (c)(1),
(2) Date: Nov. 21, 2024

(87) PCT Pub. No.: WO2024/006948

PCT Pub. Date: Jan. 4, 2024

(65) Prior Publication Data

US 2025/0320986 A1 Oct. 16, 2025

Related U.S. Application Data

(63) Continuation-in-part of application No. 18/161,278, filed on Jan. 30, 2023, now Pat. No. 11,821,597.

(Continued)

(51) Int. Cl.
*F21V 19/00* (2006.01)
*F21S 4/28* (2016.01)

(Continued)

(52) U.S. Cl.
CPC .............. *F21V 19/004* (2013.01); *F21S 4/28* (2016.01); *F21V 15/013* (2013.01);
(Continued)

(58) Field of Classification Search
CPC .......... F21S 4/20–28; F21V 15/01–015; F21V 19/001–0055; F21Y 2103/10; F21Y 2113/00–20; F21Y 2115/00–20
See application file for complete search history.

(56) References Cited

U.S. PATENT DOCUMENTS 6,481,130 B1 11/2002 Wu
6,502,956 B1 1/2003 Wu
(Continued)

FOREIGN PATENT DOCUMENTS

AT 516205 B1 12/2016
CN 208457630 U 2/2019
(Continued)

OTHER PUBLICATIONS

International Search Report and Written Opinion for PCT/US2023/069440, mailed Oct. 3, 2023.
(Continued)

*Primary Examiner* — Jason M Han
(74) *Attorney, Agent, or Firm* — Patentbest; Andrew McAleavey

(57) ABSTRACT

A linear luminaire includes an enclosure with a top that is at least translucent. The enclosure may be extruded from a plastic or, in some cases, co-extruded with two different materials so that the pair of sidewalls can be made of an opaque material. The enclosure may be open along a bottom side opposite the top. In some embodiments, an elongate rigid printed circuit board (PCB) carrying LED light engines is installed between the pair of sidewalls in slot structure defined on respective inner faces. The PCB may carry connecting structure staggered along the length of its underside. In some embodiments, the PCB may be adapted to accept high-voltage alternating current (AC) directly, without converting the power to another form.

20 Claims, 18 Drawing Sheets

Related U.S. Application Data

(60) Provisional application No. 63/498,933, filed on Apr. 28, 2023, provisional application No. 63/357,150, filed on Jun. 30, 2022.

(51) Int. Cl.

| | |
|---|---|
| ***F21V 15/01*** | (2006.01) |
| ***F21Y 103/10*** | (2016.01) |
| ***F21Y 113/00*** | (2016.01) |
| ***F21Y 115/10*** | (2016.01) |

(52) U.S. Cl.
CPC ....... *F21Y 2103/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 8,408,734 | B2 | 4/2013 | Wu et al. | |
| 8,508,141 | B2 | 8/2013 | Takeda et al. | |
| 8,998,448 | B2 | 4/2015 | Chang | |
| 9,091,422 | B2 * | 7/2015 | Greenfield | F21V 23/02 |
| 9,279,544 | B1 | 3/2016 | Dankelmann et al. | |
| 9,644,836 | B1 | 5/2017 | Field et al. | |
| 10,028,345 | B2 | 7/2018 | Petersen et al. | |
| 10,125,968 | B2 | 11/2018 | Zanotto et al. | |
| 10,344,925 | B2 | 7/2019 | Siltanen | |
| 10,663,148 | B1 * | 5/2020 | Heredia | F21V 21/35 |
| 11,118,758 | B1 | 9/2021 | Greenspan et al. | |
| 11,168,852 | B1 | 11/2021 | Irons et al. | |
| 11,199,300 | B1 * | 12/2021 | Irons | F21V 23/002 |
| 2005/0122742 | A1 | 6/2005 | Ho | |
| 2005/0239227 | A1 | 10/2005 | Aanegola et al. | |
| 2007/0274084 | A1 * | 11/2007 | Kan | F21S 4/20 362/373 |
| 2008/0203936 | A1 | 8/2008 | Mariyama et al. | |
| 2010/0025700 | A1 | 2/2010 | Jung et al. | |
| 2010/0157608 | A1 | 6/2010 | Chen et al. | |
| 2011/0075443 | A1 | 3/2011 | Huang et al. | |
| 2012/0146536 | A1 | 6/2012 | Mullen et al. | |
| 2016/0061390 | A1 | 3/2016 | Osten et al. | |
| 2016/0363293 | A1 | 12/2016 | Munarin et al. | |
| 2018/0058637 | A1 | 3/2018 | Thiel | |
| 2020/0109828 | A1 | 4/2020 | Tolen et al. | |
| 2020/0386374 | A1 | 12/2020 | He | |
| 2021/0231272 | A1 | 7/2021 | Bianchi | |
| 2021/0270452 | A1 | 9/2021 | Wu | |
| 2022/0015207 | A9 | 1/2022 | Miskin et al. | |
| 2022/0057055 | A1 | 2/2022 | Findlay et al. | |
| 2022/0228723 | A1 | 7/2022 | Bryan | |

FOREIGN PATENT DOCUMENTS

| | | | |
|---|---|---|---|
| DE | 202014104796 | U1 | 1/2016 |
| EP | 2541124 | A2 | 1/2013 |
| JP | 2017208205 | A | 11/2017 |
| KR | 101598123 | B1 | 3/2016 |

OTHER PUBLICATIONS

Supplementary European Search Report for European Counterpart Application No. 23832613.6, dated Sep. 5, 2025.

* cited by examiner

LINEAR LUMINAIRE

TECHNICAL FIELD

The invention relates to linear luminaires.

BACKGROUND

Linear lighting is a class of solid-state lighting in which an elongate, narrow printed circuit board (PCB) is populated with a series of light-emitting diode (LED) light engines, usually spaced apart at a regular spacing or pitch. Typically, the LED light engines are surface-mounted on the PCB. The PCB itself may be either rigid, made of a material like FR4, aluminum, or ceramic, or flexible, made of a film or films of polyimide or biaxially-oriented polyethylene terephthalate (BoPET; MYLAR®). Various additional components may be mounted on the PCB and connected to the LED light engines to set the current in the circuit, to control the LED light engines, and for other reasons.

Connected to an appropriate source of power, linear lighting is considered to be a luminaire in its own right, and it is also used as a raw material in more complex luminaires. In the most common type of luminaire based on linear lighting, the linear lighting PCB is placed in a channel and covered with a cover. The channel provides at least some protection against ingress of dust and dirt and may also provide some degree of protection against ingress of water and moisture. In addition, the features of the channel may facilitate mounting in particular locations, e.g., hanging from a ceiling, or within a wall. The cover may be transparent and may simply allow the light to pass, or it may be an optical element, e.g., a lens or a light diffuser.

The most common type of channel has two parallel walls spaced apart by a perpendicular base or bottom, giving the channel a U- or C-shaped cross-section. The channel itself is usually opaque, and top portions of the two parallel walls have structure to seat and engage the cover. For example, U.S. Pat. No. 9,279,544, the contents of which are incorporated by reference in their entirety, discloses a number of different channels. U.S. Pat. No. 11,168,852, the contents of which are also incorporated by reference in their entirety, discloses a variation on this, in which the channel has an upper compartment for the linear lighting and a lower compartment that serves as a raceway and can accept mounting structure.

BRIEF SUMMARY

One aspect of the invention relates to a linear luminaire. The linear luminaire comprises an open enclosure, at least a portion of which is light-transmissive. A thin, elongate, narrow, and rigid printed circuit board (PCB) carrying LED light engines is positioned in, and closes, an open face of the enclosure. The open enclosure may include a top, which is the light-transmissive portion, and a pair of sidewalls. The PCB may be installed to extend generally parallel to the light-transmissive portion. The open enclosure generally has the same cross-sectional shape across its length, and may be, e.g., extruded from a single plastic, or co-extruded from two or more plastics to define both the top and the pair of sidewalls. For example, if two plastics are used, the plastic used for the pair of sidewalls may have opaque additives.

In linear luminaires of this type, the PCB may be constructed, arranged, and otherwise adapted to be as narrow as possible, and another aspect of the invention relates to PCBs that are particularly adapted for narrow linear luminaires.

For example, the PCB may include any necessary or desirable components other than the LED light engines, such as resistors and power connectors, on its reverse side. Power and data connectors may be staggered along the length of the PCB on its reverse side, in order to reduce the width that would otherwise be required if the connectors were side-by-side with one another. In some cases, the PCB may carry multiple sets of power and data connectors, one at each end of the PCB, so that adjacent linear luminaires can be connected together end-to-end to draw power and control signals from the same source.

In many embodiments according to these aspects of the invention, the linear luminaire will be adapted to emit a continuous, unbroken line of diffused light with minimal space available for diffusion. To this end, the PCB may include a large number of LED light engines spaced together at a minimal pitch, essentially immediately adjacent to one another on the upper surface of the PCB. In the kind of linear luminaire described above, this may allow a PCB to be placed very close to the emitting top surface of the open enclosure and still produce a diffused, even line of light.

The open enclosure may include a cableway, raceway, or other space for passing wires and cables. That space may, e.g., be defined below a position at which the PCB is mounted and may include engaging structure for securing mounting clips and other hardware with complementary mounting structure.

Another aspect of the invention relates to structures and methods for securing endcaps to a linear luminaire like that described above, and to linear luminaires that use such structures. In some embodiments, a linear luminaire may include endcaps. Those endcaps may be, e.g., flat pieces of opaque, shaped plastic with pressure-sensitive adhesive that are adhered to the end faces of the linear luminaire.

In other embodiments according to this aspect of the invention, the endcaps may be secured to structures that are mounted elsewhere on the linear luminaire. For example, a mounting clip adapted for installation into a cableway or other such space may include a thin longitudinal extension that carries engaging structure for engaging and securing an endcap. The endcap may be installed on the mounting clip and the mounting clip secured within the space provided in the linear luminaire. In this arrangement, the endcaps are retained on the linear luminaire not by engagement with the end faces of the linear luminaire, but by engagement between the endcaps and other parts of the linear luminaire. In some cases, the endcap may additionally carry at least some structure to engage the end faces of the linear luminaire.

More specifically, one embodiment according to this aspect of the invention relates to a linear luminaire. The linear luminaire includes a channel with a first compartment and a second compartment. The second compartment has engaging structure. One or more strips of linear lighting are disposed in the first compartment. A structure is adapted to be mounted in the second compartment. The structure includes an extension that, when the structure is installed in the second compartment, extends along or parallel to a long axis of the channel, terminating proximate to an end of the channel. Mounting structure is at the end of the extension, and an endcap is adapted to be received in and secured by the mounting structure to cover the end of at least the first compartment of the channel.

A further aspect of the invention also relates to linear luminaires. A linear luminaire according to this aspect of the invention comprises an open enclosure, at least a portion of which is light-transmissive. A thin, elongate, narrow, and rigid printed circuit board (PCB) carrying LED light engines is carried along one sidewall or portion of the open enclosure, leaving an aspect or portion of the enclosure open. The open enclosure may include a top, which is the light-transmissive portion, and a pair of sidewalls. The PCB may be installed along one of the sidewalls with LED light engines oriented to emit light toward the other sidewall. The open enclosure generally has the same cross-sectional shape across its length, and may be, e.g., extruded from a single plastic, or co-extruded from two or more plastics to define both the top and the pair of sidewalls. For example, if two plastics are used, the plastic used for the pair of sidewalls may have opaque additives.

Linear luminaires according to this aspect of the invention may use a variety of structures and techniques to change the properties of the light from the LED light engines prior to emission from the linear luminaire. In the most basic embodiments according to this aspect of the invention, light may simply reflect off of the opposite sidewall and escape from the light-transmissive top of the enclosure. The opposite sidewall may include a curved, reflective inner wall to provide some focus to the incident, reflecting light rays.

In some cases, linear luminaires according to this aspect of the invention may use refraction, or a combination of refraction and reflection, to shape and direct the light emitted by the LED light engines. For example, the opposite sidewall toward which the light is emitted may include refractive facets that direct the light in a particular manner and may also change its characteristics, such as its beam width. Such facets may be used, e.g., to create an emitted beam of light that has a beam width narrower than that of the LED light engines and is centered around an angle offset from the centerline of the top of the enclosure.

Linear luminaires according to aspects of the invention may be particularly suited for placement in narrow grooves, e.g., in millwork or in other types of inlays. Open enclosures may have features adapted for placement and retention in grooves and other such features. For example, a linear luminaire that carries its PCB along one sidewall and leaves an open bottom may have an outward cant to its sidewalls. Those sidewalls may deflect inward to fit within a groove, and the outward pressure created by the resilience of the sidewalls may help to retain the linear luminaire within the groove without adhesives or fasteners. Outer faces of the sidewalls may also be equipped with gripping structure, either omnidirectional gripping structure, like surface roughening, or directional structure, like oriented barbs or spines. Some linear luminaires may include both omnidirectional and directional gripping structure, like surface roughening and barbs.

Yet another further aspect of the invention relates to a high-voltage linear luminaire. A linear luminaire according to this aspect of the invention has a lighting circuit that is adapted to accept, e.g., high-voltage alternating current (AC) power directly, without any elements provided to convert that power into another form. Two series of LEDs may be used, one series connected to power so as to be forward-biased when the voltage is positive during the AC power cycle, and another series connected to power so as to be forward-biased when the voltage is negative during the AC power cycle. LEDs of the two series of LEDs may be physically interdigitated with one another on a PCB.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
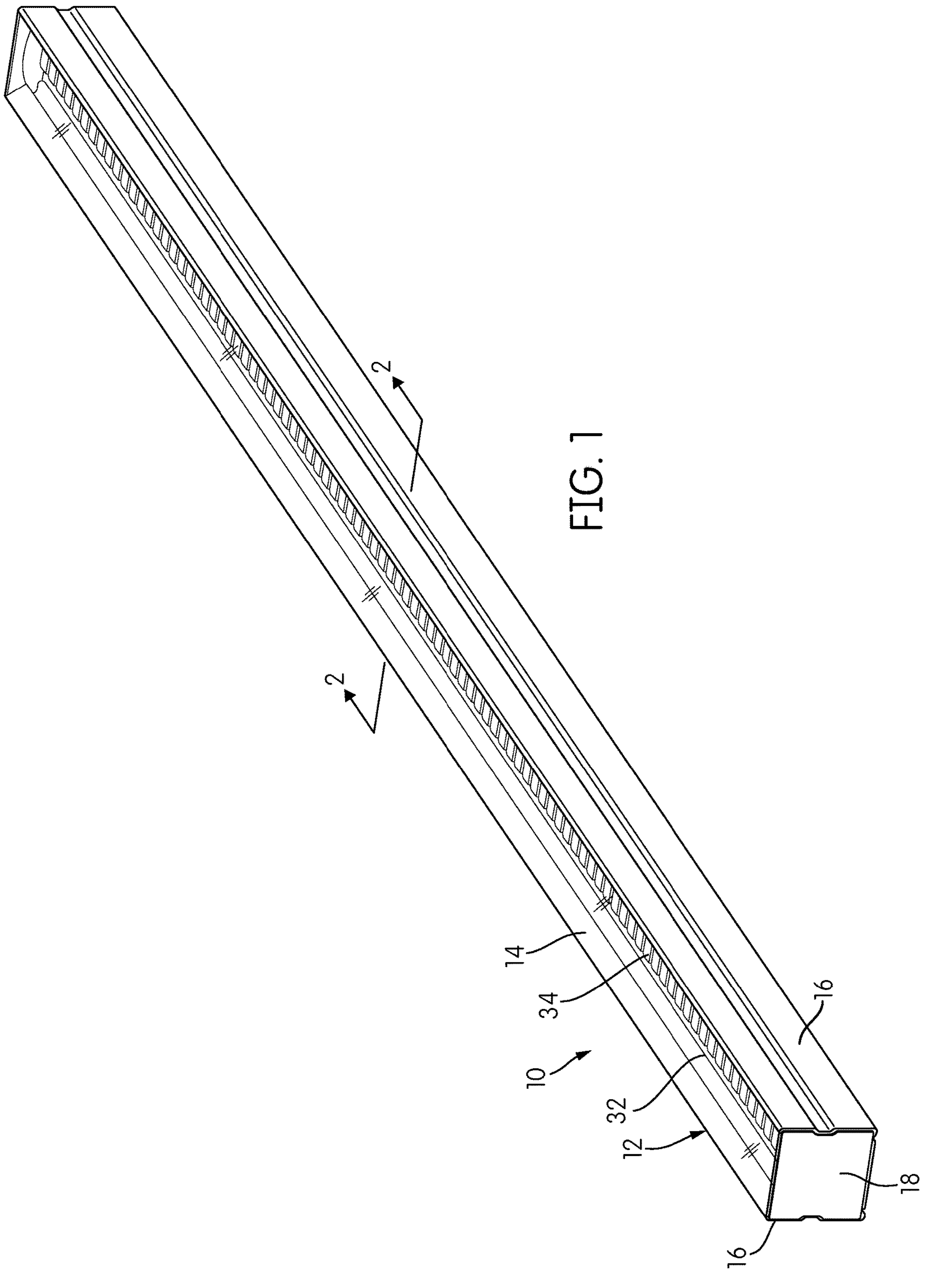
FIG. 1 is a perspective view of a linear luminaire according to one embodiment of the invention.
Figure 2:
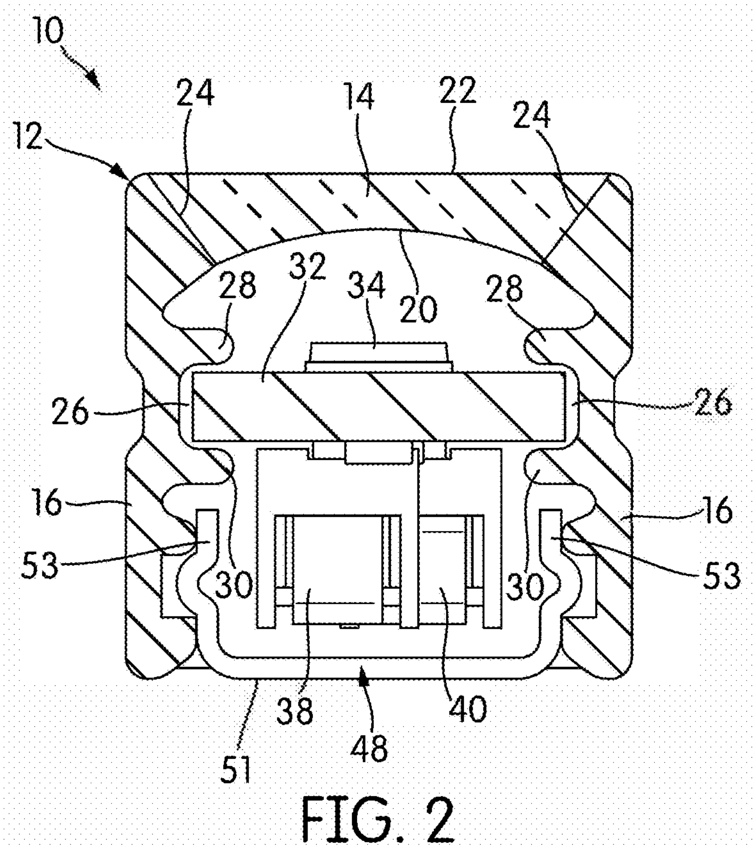
FIG. 2 is a cross-sectional view taken through Line 2-2 of FIG. 1.

FIG. 1 is a perspective view of a linear luminaire, generally indicated at 10, according to one embodiment of the invention. FIG. 2 is a cross-sectional view of the linear luminaire 10, taken through Line 2-2 of FIG. 1, essentially at the midpoint of the linear luminaire 10.

As shown in FIGS. 1-2, the linear luminaire 10 comprises a three-sided enclosure 12. Whereas a traditional channel or enclosure for a linear luminaire might have a bottom and two upwardly-extending parallel sides, the "sense" of the enclosure 12 is opposite that of a typical linear luminaire: the enclosure 12 has a top 14, from which two generally parallel sidewalls 16 depend (i.e., extend downwardly). The sidewalls 16 of the illustrated embodiment are mirror images of one another. In contrast to a more traditional luminaire, the linear luminaire 10 of FIGS. 1-2 does not have a defined bottom; the bottom of the enclosure 12 is open with no particular sealing or closing structure used. The two respective ends of the enclosure 12 are closed with endcaps 18, as can be seen in FIG. 1.

The top 14 of the linear luminaire 10 is at least translucent, i.e., at least partially light-transmissive. The top 14 may simply transmit light, or it may be designed to modify the light in some way, e.g., by diffusing, focusing, or otherwise directing it. If the top 14 is to diffuse light, it may include a diffusing additive, like titanium dioxide microspheres. If the top 14 is to focus the light, it may be shaped as a lens and include at least one curved surface. In the illustrated embodiment, the top 14 has the attributes of a plano-concave lens, with a concavely-curved lower or inner surface 20 and a planar outer surface 22. In other embodiments, the top 14 may have the attributes of a convex lens, a Fresnel lens, or any other type of lens.

In some embodiments, the top 14 and the sides 16 may both be light-transmissive. In the illustrated embodiment, however, the top 14 is light-transmissive while the sides are opaque. As shown particularly in FIG. 2, the light-transmissive top 14 meets the sides 16 at angled interface lines 24.

The enclosure 12 would typically be made of a plastic. If the top 14 and sides 16 have the same optical properties (e.g., the same level of light transmissibility), the entire enclosure 12 may be made of the same material by extrusion. If top 14 and sides 16 have different properties, they may still be made as a single unitary piece by a process like co-extrusion. If manufactured by co-extrusion, the top 14 and sides 16 may be made of the same base plastic resin with different additives, i.e., with an opaque additive added to the sides 16. In general, polycarbonate, acrylic, poly(vinyl chloride) (PVC) and similar naturally-transparent plastics may be used. In some embodiments, glass and more exotic materials may be used. If the top 14 is to have refractive properties, its index of refraction would generally be higher than that of air, and the material of which it is made may be specifically chosen for its index of refraction or, in some cases, its index of refraction with respect to certain specific wavelengths of light.

While co-extrusion is one convenient way to make an enclosure 12 with a top 14 and sides 16 that differ in their translucency or other properties, there is no requirement that the enclosure 12 be made by extrusion or co-extrusion. Instead, the top 14 and sides 16 may be made separately and joined together after initial manufacture, e.g., by thermal fusion, ultrasonic welding, adhesives, or some other process that is compatible with the materials that are used. If the top 14 and sides 16 are not extruded, co-extruded, or made by another process that requires a thermoplastic material, the sides may be made of metal, wood, or a wide variety of other materials. More exotic materials, like glasses and sapphire, may also be used.

On each side, the enclosure defines a groove 26 with a pair of parallel upper and lower ridges 28, 30. The two grooves 26 are aligned with one another across the interior width of the enclosure 12 and form a channel or slot, into which a printed circuit board (PCB) 32 inserts. The PCB 32 is provided with no mechanical support other than the lower ridges 30. In order to maintain its shape without additional mechanical support, the PCB 32 in this embodiment is rigid, made of a material such as FR4 composite, ceramic, aluminum, or the like. The term "rigid," as used here, means that the PCB 32 can support its own weight against gravity in the position illustrated in FIG. 2 without bowing or buckling in width or in length. As those of skill in the art will appreciate, rigidity is a function of both material and thickness; a particularly stiff material may be used in thin section, whereas an inherently flexible material may be sufficiently rigid in thick section.

As can be seen particularly in FIG. 1, the PCB 32 carries a plurality of LED light engines 34 on its upper surface, facing the top 14, such that light emitted from the LED light engines 34 can leave the linear luminaire 10 via the top 14. The term "LED light engine," as used here, refers to one or more light-emitting diodes packaged with all necessary connections for mounting on a PCB like the PCB 32. The LED light engines 34 may be of any type, and some embodiments may use multiple types of LED light engines 34 on the same PCB 32. For example, an LED light engine 34 may emit a single color of light, or it may emit multiple colors of light. LED light engines 34 that emit multiple colors of light are usually equipped with independently-controlled red, green, and blue LEDs so that essentially any color can be emitted by a process of additive color mixing. LED light engines 34 that are intended to emit so-called "white" light are usually of the blue-pump variety: the LED light engine 34 contains one or more blue-emitting LEDs and is topped by a phosphor, a chemical or chemical mixture that absorbs blue light and re-emits a broader or different spectrum of light wavelengths. The emitted light may be of any color or color temperature. The LED light engines 34 of the illustrated embodiment are surface-mounted on the PCB 32, although other mounting methods, such as through-hole mounting, may be used in other embodiments.

There is a particular advantage of the luminaire 10 that can be appreciated from the cross-section of FIG. 2: because of the arrangement of the enclosure 12, there is no structure that blocks the light from the light engines 34 or creates shadows. In a traditional channel-based luminaire, there would typically be some structure that allows a cover to engage with the upper sidewalls of the channel, and that engaging structure typically blocks light or creates shadows, preventing the light from the linear lighting from extending all the way to the lateral edges of the light-emitting surface. In the enclosure 12, there is no such issue—the top 14 is integral with the sides 16, the interior of the enclosure 12 is straight sided, and there is nothing to block light or to create shadows. Thus, the luminaire 10 is more likely to emit light uniformly to the lateral edges of the top 14.

The luminaire 10 of the illustrated embodiment is designed to be small, smaller than most conventional linear luminaires. For example, in one embodiment, the enclosure 12 may be 12.2 mm in overall height, with an internal width of 10.15 mm. The wall thickness of each of the sidewalls 16 may be less than 1 mm, e.g., 0.85 mm. The upper and lower ridges 28, 30 may extend inward about 3 mm. Of course, luminaires 10 according to embodiments of the invention may be made to various sizes. Additionally, while the enclosure 12 is nearly square in outer dimensions, other enclosures may have other proportions. For example, an enclosure 12 may be made taller in order to have more room for wires and cables.

The electrical configuration of the PCB 32 is not critical to the invention and may be of any type in various embodiments. However, there may be certain advantages in certain configurations. In the illustrated embodiment, for example, the LED light engines 34 are closely spaced at a tight pitch on the upper surface. This has the advantage of providing an essentially unbroken line of light across the length of the linear luminaire 10.

There are often other components in an electronic circuit that drives (i.e., powers and controls) LED light engines, and any of those components may be included on, or in association with, the PCB 32. For example, because of the voltage-current characteristics of LEDs, once an LED is forward-biased and begins emitting light, its resistance to the flow of current drops. This means that without some additional element to set and limit the current in the circuit, the LED light engines 34 may draw enough current to burn themselves out. Current-limiting elements may be included in the driver (i.e., the power supply), or they may be included on the PCB 32 itself.

Figure 3:
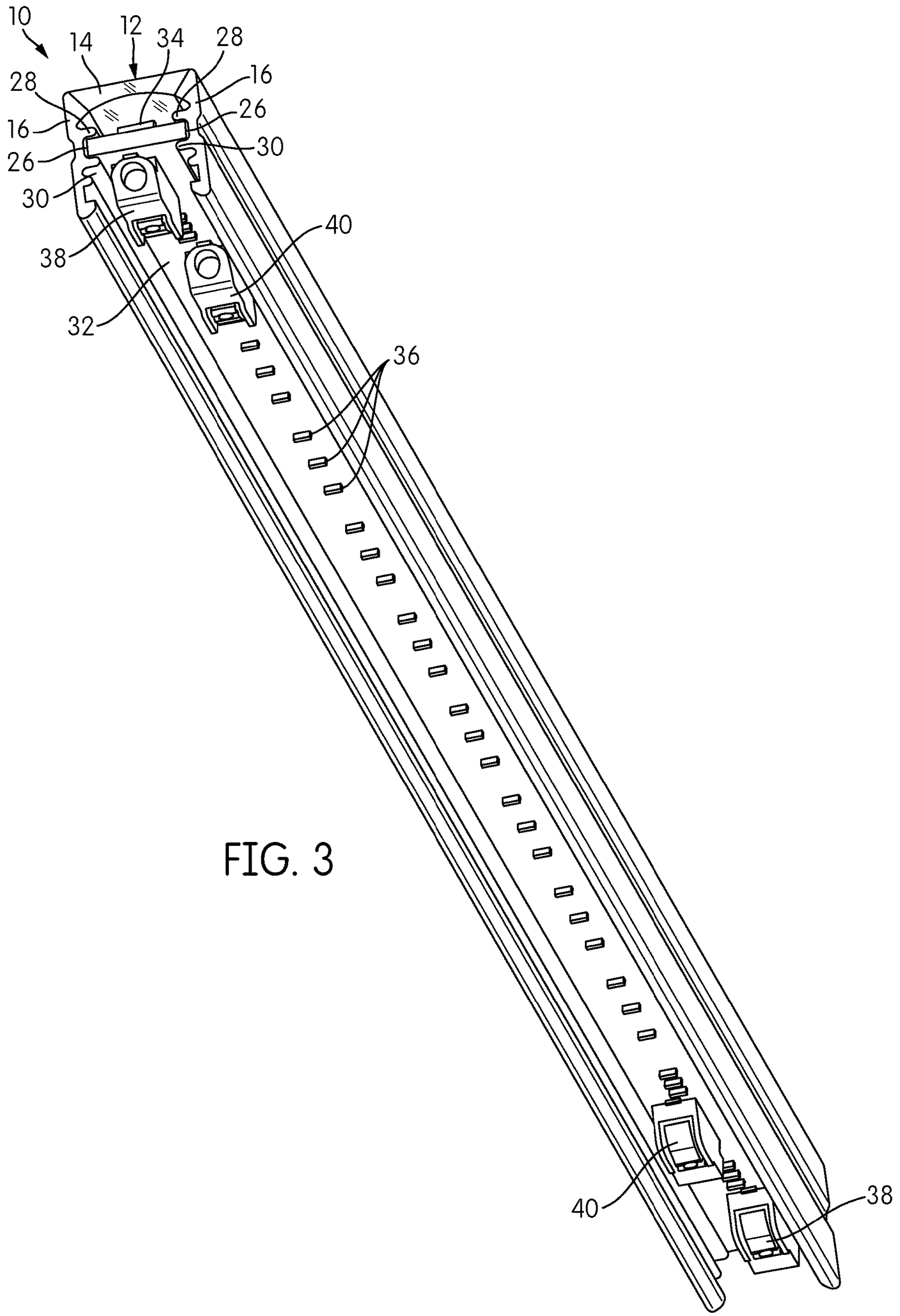
FIG. 3 is a perspective view of the underside of the linear luminaire, illustrating its electrical connecting structure and additional components.

FIG. 3 is a perspective view of the underside of the linear luminaire 10, in particular showing the underside of the PCB 32. While electrical components may be placed on either surface of the PCB 32, in the illustrated embodiment, some components are placed on the underside of the PCB 32, which may allow the PCB 32 to be narrower in at least some embodiments than a PCB with all components installed on its upper surface. Specifically, on the underside of the PCB 32, there are a number of surface-mount resistors 36, which act as current control elements. In other embodiments, current-controlling driver integrated circuits (ICs) may be used. Any elements necessary to drive the LED light engines 34 may be mounted on the underside of the PCB 32.

Additionally, at each end of the PCB 32, a pair of connectors 38, 40 is mounted. In some linear luminaires, similar connectors might be side-by-side with one another. However, in this embodiment, the connectors 38, 40 are staggered in position, one connector 38, 40 behind the other connector 38, 40 along the length of the PCB 32. This arrangement may allow the PCB 32 to be narrower than a comparable PCB in which the connectors are placed side-by-side.

Typically, one of the connectors 38 would serve as a positive terminal for connection of power, while the other connector 40 would serve as a minus-return terminal. The connectors of the illustrated embodiment are arranged such that either pair of connectors 38, 40 can be used for power input and either pair of connectors 38, 40 can be used for power output. This means that one pair of connectors 38, 40 connects the PCB 32 to power while the other can optionally be used to connect the PCB 32 to the PCB 32 of an adjacent linear luminaire 10 to provide power to that linear luminaire 10. In essence, with this arrangement, two adjacent linear luminaires 10 can be "daisy chained" together for power. In this embodiment, the connectors 38, 40 are of the type that will capture a wire that is pushed into them. In other embodiments, the connectors 38, 40 may be screw-terminal connectors or connectors of some other form. The presence of two connectors 38, 40 assumes that the LED light engines 34 require only positive and minus-return terminals. If the LED light engines 34 require additional control signals, additional connectors may be provided, arranged in a fashion similar to the connectors 38, 40.

The staggered connectors 38, 40 also allow wires and cables to pass around and between them. This allows wires and cables to run along the underside of the PCB 32, to bring power and control signals to adjacent linear luminaires 10 in the kind of daisy-chained configuration described above.

As those of skill in the art will appreciate, connectors 38, 40 are but one type of connecting means that could be used in various embodiments of the invention. Solder pads on either side of the PCB could be used in some embodiments, as could through-hole mounting of wires.

Physically, the LED light engines 34 are in series with one another. Electrically, the PCB 32 may be arranged in repeating blocks, with sets of LED light engines 34 electrically in parallel with one another. Each repeating block is a complete lighting circuit that will light if connected to power. The concept of repeating blocks is disclosed, e.g., in U.S. Pat. No. 10,028,345, the contents of which are incorporated by reference herein in their entirety. One advantage of a repeating-block arrangement is that the PCB 32 can be cut to length by cutting between adjacent repeating blocks. In some cases, with a PCB 32 arranged in repeating blocks and a plastic enclosure 12, an installer may be able to cut the linear luminaire 10 to a desired length in the field using common tools. That desired length would be limited only by the physical length of each repeating block.

The description above assumes that the PCB 32 operates at low voltage with direct current (DC) power. The definition of "low voltage" varies with the authority one consults; however, for purposes of this description, the term refers to voltages under 50V. High-voltage PCBs 32 may require encapsulation or other insulative or protective measures to be taken. If the linear luminaire 10 is intended to operate using alternating current (AC) power, the PCB 32 may include components to convert the AC power to DC power useable by the LED light engines 34, such as rectifiers and filtering or smoothing components. U.S. Pat. No. 10,028,345 describes on-board power conversion circuits for linear lighting.

In the above description, it is the PCB 32 itself that is rigid. That need not be the situation in all embodiments. In some embodiments, the rigidity could be created by some other component. For example, a flexible PCB could be secured to and backed by a more rigid carrier, such as a strip of metal or plastic. The flexible PCB could be made of, e.g., a polyester film, like biaxially-oriented polyethylene terephthalate (BoPET; MYLAR®), a polyimide film, a thin metal film, etc. If this is done, the securement may be by means of a pressure-sensitive adhesive on the underside of the PCB, a one-part air-curing adhesive, or a two-part adhesive. A flexible PCB on a more rigid carrier could potentially reduce the width, and even the height, of the luminaire as a whole. If components are to be mounted on the underside of a flexible PCB on a carrier, the carrier would typically be notched, slotted, or otherwise cut to allow that.

With respect to the physical arrangement of the linear luminaire 10, as can be seen in FIGS. 2 and 3, the sides 16 extend below the position of the PCB 32. The area below the PCB 32 serves as a raceway for wiring as well as a space where hardware like mounting clips can be connected. A second pair of slots 42 are defined along respective inner faces of the sides 16, again by upper and lower ridges 44, 46. These slots 42 serve as cooperating engaging structure, e.g., for mounting the linear luminaire 10. As shown in FIG. 2, a mounting clip 48 has a floor 51 and a pair of upwardly-extending sides 53 spaced apart by the floor 51. There are outward projections 50 on each side 53 that engage with the slots 42 to secure the mounting clip 48. The mounting clip 48 may carry holes, slots, or any other structure necessary to engage with fasteners or other types of external mounting hardware.

Figure 4:
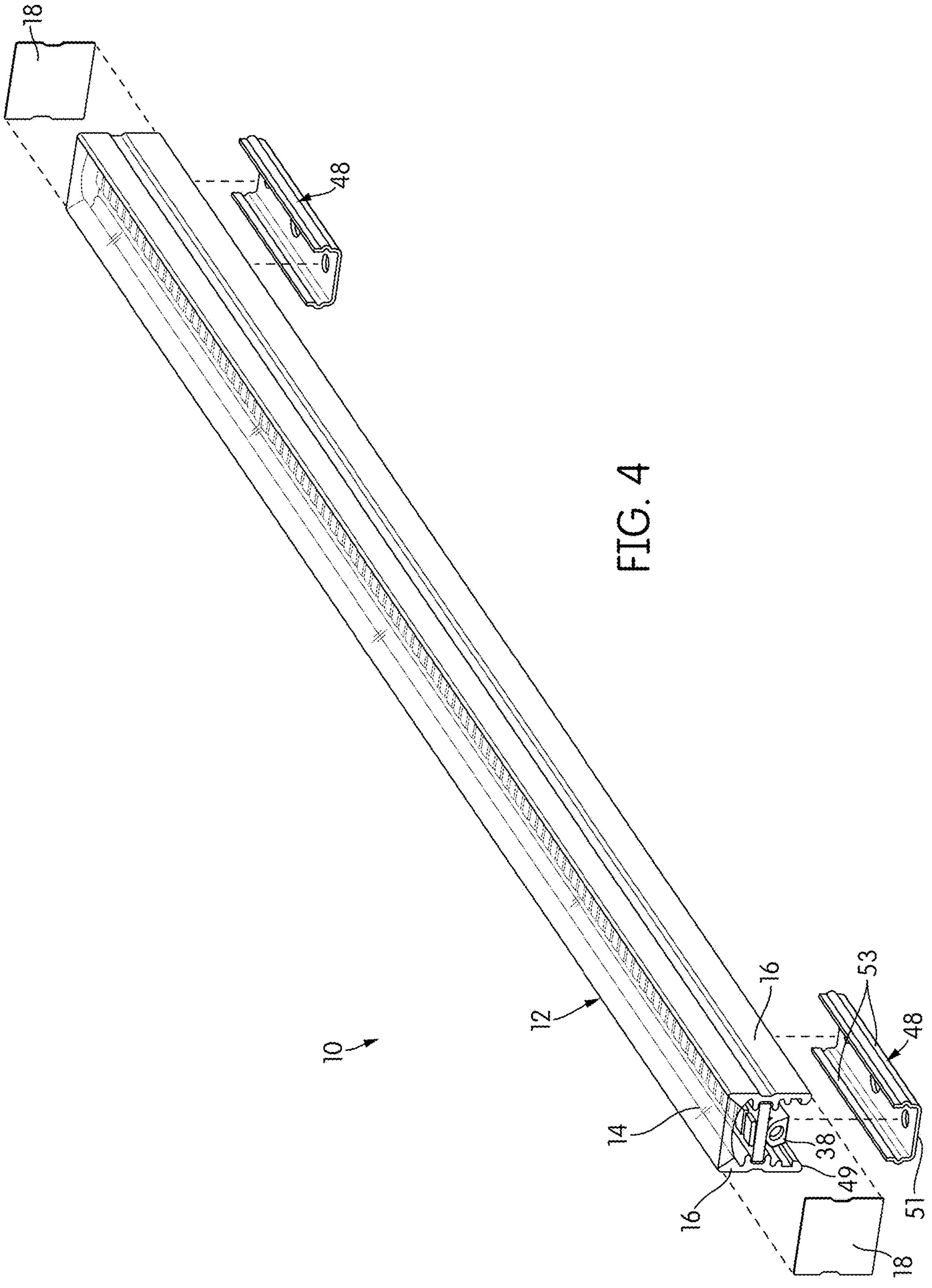
FIG. 4 is an exploded view of the linear luminaire of FIG. 1, illustrating the attachment of endcaps and mounting clips.

FIG. 4 is a partially exploded view of the linear luminaire 10. Any number of mounting clips 48 may fit into the linear luminaire 10, depending on its length, and two are shown in the view of FIG. 4. The bottom edges of the sides 16 have a slight inward slope 49 to guide elements like the mounting clips 48 into place. The mounting clips 48 are only one example of any number of things that may be inserted into the slots 42, typically to secure the linear luminaire 10 to some external structure, although things secured in the slots 42 may have other purposes as well.

Additionally, as was described briefly above, endcaps 18 close the ends of the linear luminaire 18. The endcaps 18 will be described in more detail below.

Figure 5:
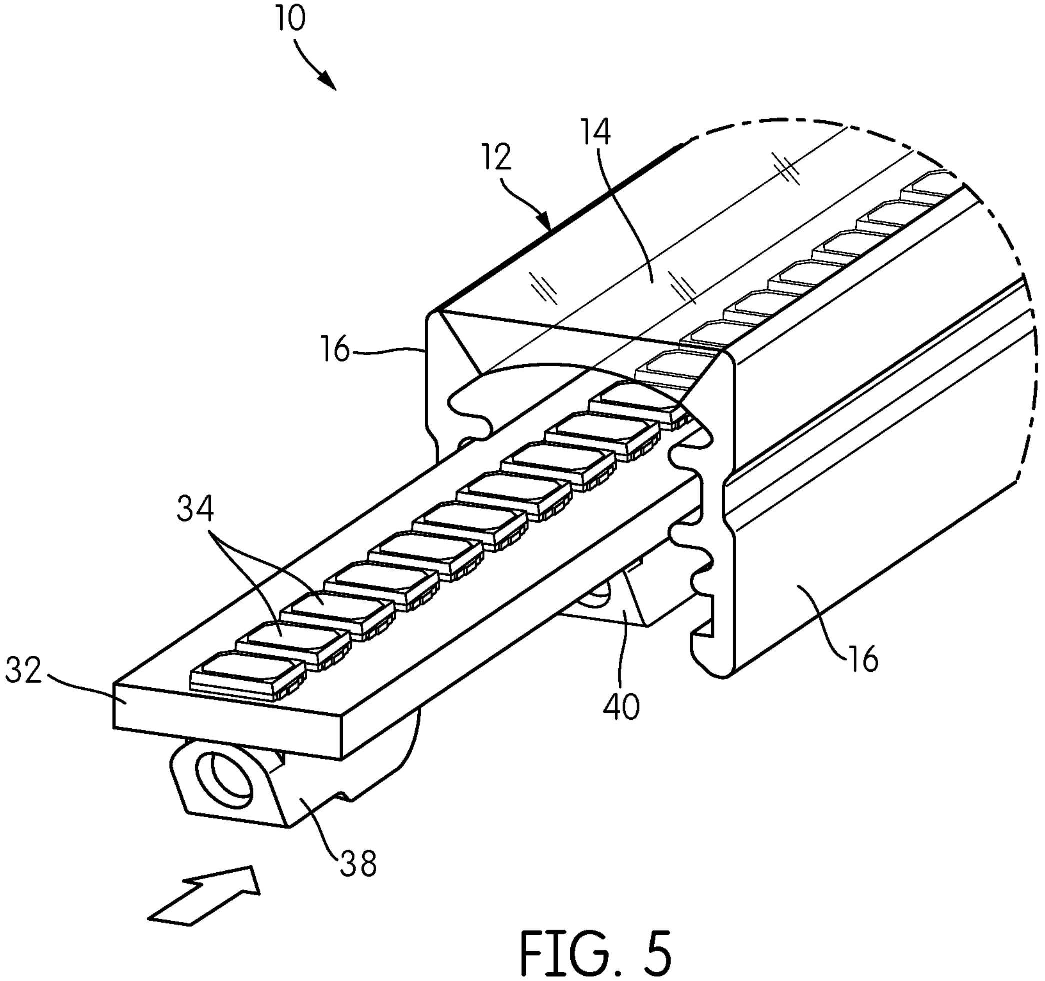
FIG. 5 is an enlarged perspective view showing one end of the linear luminaire of FIG. 1, illustrating the insertion and placement of a printed circuit board (PCB) including LED light engines within the enclosure of the linear luminaire.
Figure 6:
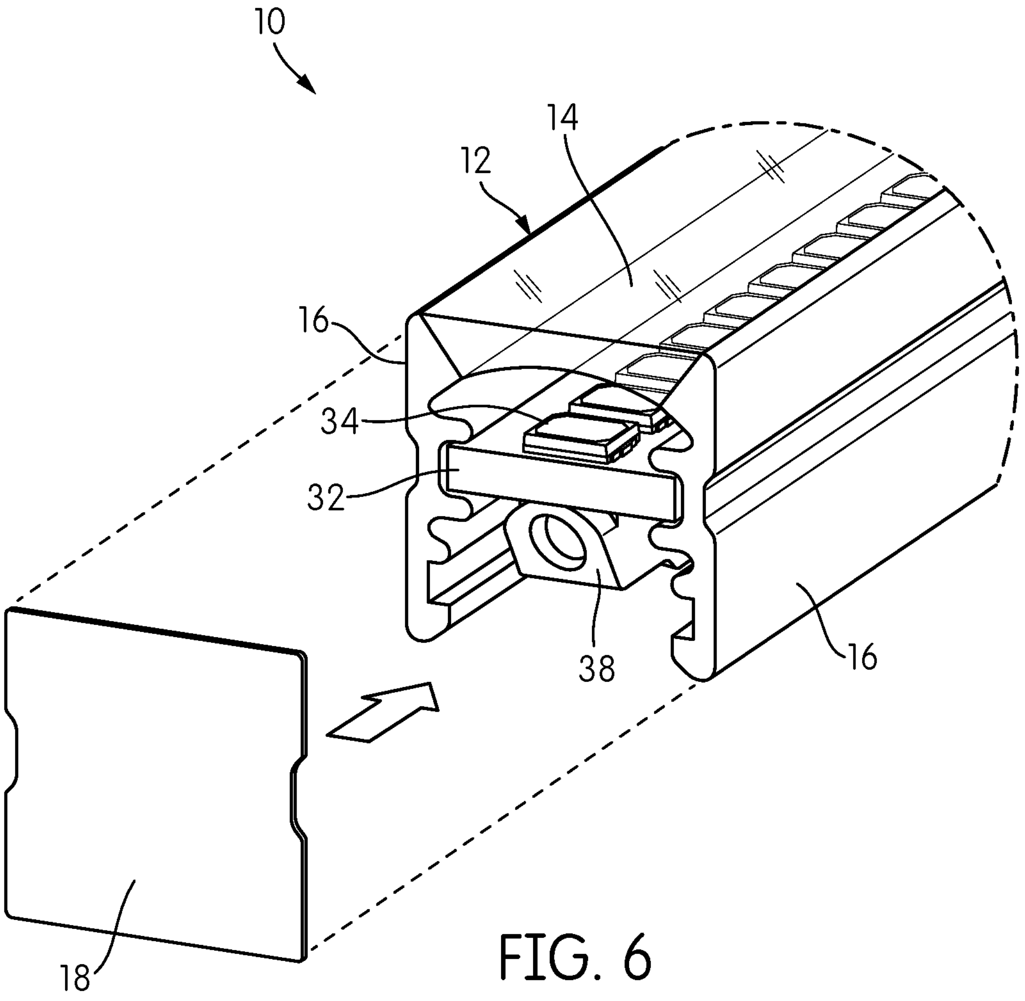
FIG. 6 is an enlarged perspective view similar to the view of FIG. 5, illustrating the placement of an endcap on the end face of the linear luminaire.

FIGS. 5 and 6 are enlarged exploded views of one end of the linear luminaire 10. As shown in FIG. 5, the PCB 32 is usually slid into place within the enclosure 12, although in some cases, depending on the material of which the enclosure 12 is made, it may be possible to deflect the sides 16 slightly and snap the PCB 32 into place.

FIG. 6 illustrates the installation of an endcap 18. Most linear luminaires use endcaps with some form of mechanical structure that engages the channel to secure the endcap. However, the endcaps 18 have no such structure. Instead, the endcaps 18 are generally flat pieces with pressure-sensitive adhesive that adheres to the ends of the enclosure 12. For example, the endcaps 18 may be thin polycarbonate pieces with opaque additives to block any light that might otherwise escape. For example, the endcaps 18 may be made of 0.25 mm polycarbonate in one embodiment. FIG. 6 illustrates another aspect of this: in many cases, the PCB 32 will be sized and cut so that it is flush with the end faces 52 of the enclosure 12. This provides more surface area to which the pressure-sensitive adhesive of the endcaps 18 can adhere. The endcaps 18 and their adhesive may serve to secure the PCB 32 in place, although in some cases, a small amount of adhesive may be used on the PCB 32 itself, e.g., to fix it within the slots 26.

The endcaps 18 may provide a modicum of ingress protection to a portion of the linear luminaire 10 and may also help to prevent light leaks. The adhesive on the endcaps 18 may be provided either continuously over the inward-facing surface of the endcaps 18 or in any pattern likely to prevent light leaks. In some cases, epoxies and other types of adhesives may be used on the endcaps 18.

Above, it was explained that the interior configuration of the enclosure 12 may allow light to be emitted more uniformly from the top 14, with light reaching the lateral edges of the top 14, since there is no engaging structure between sidewalls 16 and top 14 that would block light. The endcaps 18 may have a similar advantage. Typical channel-based luminaires tend to suffer from dark spots at the ends of the channel, both because the PCB often stops before the end of the channel, and because the typical endcap has engaging structure that extends some distance into the channel. Yet in the luminaire 10, since the end of the PCB 32 is flush with the end faces 52 of the enclosure 12 and the endcaps 18 are particularly thin with little to no structure extending into the enclosure 12, light can be emitted essentially to the very ends of the enclosure 12. Additionally, if two luminaires 10 are abutted end-to-end with one another, the thin endcaps 18 leave very little dark space or dead space between the two luminaires 10, meaning that a long line of essentially continuous light can be produced using separate, abutted luminaires 10. By contrast, with two conventional abutted luminaires, if the endcaps are 2 mm thick, a dark gap of 4 mm would exist between the luminaires.

The linear luminaire 10 may be a bottom-entry fixture or a side-entry fixture. That is, power cables may be brought in from the side of the linear luminaire 10 or from the bottom. Cables that are brought in from the bottom would usually have no effect on the shape or extent of the endcaps 18. However, if the linear luminaire 10 is to be a side-entry fixture, the endcaps may have shape or structure to accommodate that. For example, one or both endcaps may include openings, or the bottom of at least one endcap may be shaped to accommodate a wire or cable.

Figure 7:
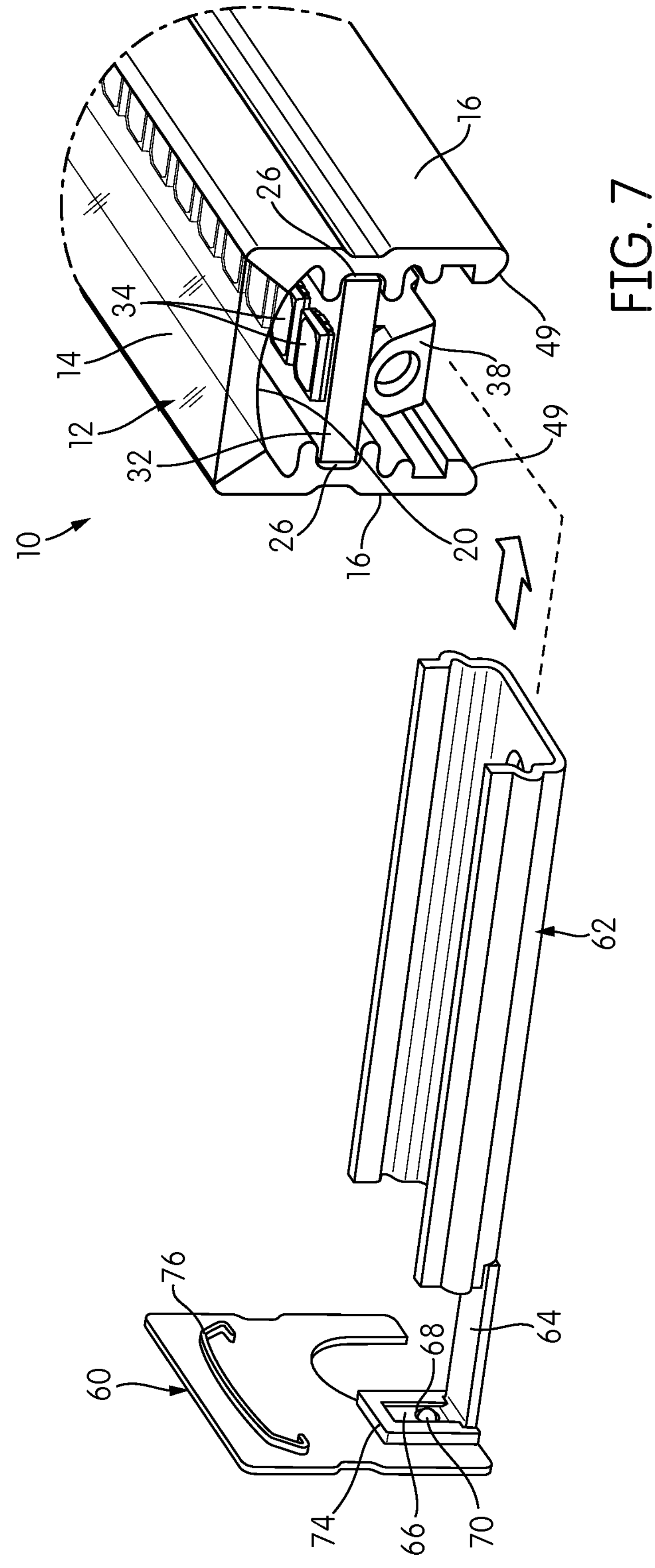
FIG. 7 is a partially exploded perspective view illustrating an alternate manner in which an endcap may be mounted to the end face of the linear luminaire.

There are other ways in which an endcap may be attached to the end of the linear luminaire 10. FIG. 7 is a partially exploded perspective view illustrating one way in which a snap-in endcap 60 can be secured to the enclosure 12. Specifically, a mounting clip 62 has all of the features of the mounting clip 48 described above and can slide or snap into place in the lower slot 42 of the enclosure 12. However, the mounting clip 62 has an additional feature: an extension 64 that, when the mounting clip 62 is installed in the slot 42, extends parallel to the longitudinal axis of the linear luminaire 10. After extending generally horizontally for some distance, the extension 64 makes a right-angle bend and has a short vertical portion 66 that carries cooperating engaging structure 68 to engage complementary structure 70 on the endcap 60. In the illustrated embodiment, the cooperating engaging structure 68 is an opening 68 and the complementary structure 70 is a small projection 70 that arises from the inner surface of the endcap 60 and is press-fit into the opening 68. In some cases, the shape of the opening 68 and the complementary structure 70 is keyed or otherwise shaped such that the endcap 60 cannot rotate once engaged with the vertical portion 66 of the extension 64. In the illustrated embodiment, the vertical portion 66 is received in an area of the endcap 60 that has a raised border 74 on three sides, which prevents rotation of the endcap 60 relative to the vertical portion 66.

With this arrangement, when the mounting clip 62 is installed, the endcap 60 can be pressed against the end of the enclosure 12. As shown, the inner surface of the endcap 60 has inwardly horizontally-extending structure 76 that complements the shape of the inner surface 20 of the top 14 and helps to seat the endcap 60 in place.

Figure 8:
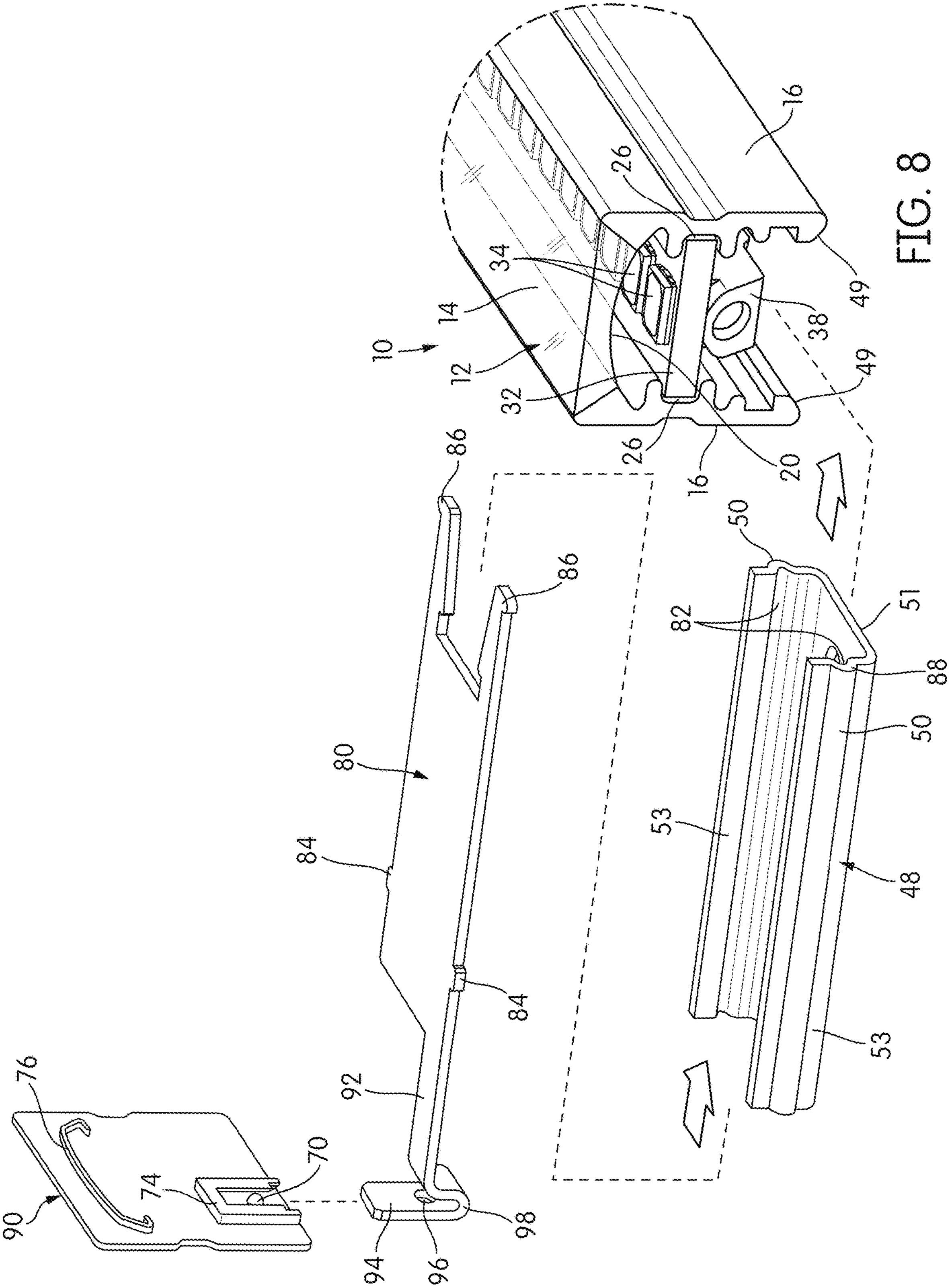
FIG. 8 is a partially exploded perspective view similar to the view of FIG. 7, illustrating another alternate manner in which an endcap may be mounted to the end face of the linear luminaire.

FIG. 8 is a partially exploded perspective view illustrating another embodiment of endcap-mounting structure. In the embodiment of FIG. 8, the mounting clip 48 described above is used without any special adaptations for endcap mounting. Instead, a bracket 80 is adapted to slide into the mounting clip 48. More particularly, as can be appreciated from at least FIG. 8, the outward projections 50 on each side of the mounting clip 48 that allow the mounting clip 48 to engage with the slots 42 of the enclosure 12 create a pair of slots 82 along the inner faces of the sidewalls of the mounting clip 48. These slots 82 serve as a channel into which the bracket 80 slides.

Specifically, a set of horizontal projections or tabs 84 extend outwardly from the bracket 80 to engage the respective slots 82. Additionally, the bracket 80 carries a set of prongs 86 at the end opposite the endcap-engaging end. These prongs 86 are long, relatively thin and, at their tips, extend horizontally outwardly to a width that is greater than the interior width of the mounting clip 48 and its slots 82. The prongs 86 are constructed and arranged to abut the far vertical end face 88 of the mounting clip 48 when the bracket 80 is installed in the mounting clip 48 in order to secure the bracket 80 within the mounting clip 48. As may be appreciated from FIG. 8, the two prongs 86 are long and thin relative to the body of the bracket 80 and may deflect inwardly somewhat as the bracket 80 is slid into place within the mounting clip 48. When the tips of the prongs 86 clear the slots 82, they would spring resiliently outwardly to engage the end face 88 of the mounting clip 48, thus securing the bracket 80.

The endcap 90 used in this embodiment is essentially the same as the endcap 60 described above with respect to FIG. 7 with one exception: as can be seen in FIG. 8, the endcap 90 does not include an opening or other structure to allow passage of a cord or cable. Thus, this endcap 90 would be used for an end of the enclosure 12 through which a cord or cable need not pass, or for a bottom-entry configuration, in which the power and/or data cable or cables come up from the bottom and do not pass through the endcaps 72, 90 at all. Despite the fact that the endcap 90 does not include an opening for cable passage, for uniformity of construction and interchangeability of parts, the engaging structures 70, 74 are located in the same position as those in the endcap 60—off-center.

In this case, it is the bracket 80 that carries a long, thin extension 92 with a vertically-extending portion 94 that includes engaging structure 96, in this case, an opening, to engage the complementary structure 70 on the endcap 90. The difference between the configuration of the bracket 80 of FIG. 8 and the specially-adapted mounting clip 62 of FIG. 7 is positional, rather than functional. Specifically, in the configuration of FIG. 7, the extension 64 arises from the floor or bottom of the mounting clip 62 and is level with it. By contrast, as was described above, the bracket 80 sits in slots 82 that lie above the floor of the mounting clip 48. Thus, in order to engage the endcap 90 and place it in the correct position against the end face of the enclosure 12, the vertical portion 94 dives below the plane of the bracket 80 and then curves back up, making a U-shaped bend 98 with respect to the extension 92 of the bracket 80. This places the vertical portion 94 and its engaging structure 96 in the correct position, given the position of the bracket 80 relative to the mounting clip 48.

In general, while many conventional endcaps make a connection solely with the end face of the enclosure or channel that they close, in embodiments of the present invention, endcaps 72, 90 may be secured to some other structure. Other configurations are possible and may be used in other embodiments of the invention. Additionally, the structures illustrated in FIGS. 7-8 and described here may be independently and more broadly applied to many different types of luminaires, and specifically including any luminaire having a first compartment that is adapted to receive one or more strips of linear lighting and a second compartment that is adapted to serve as a cableway or for accessory engagement.

The above description sets forth certain advantages of the luminaire 10, particularly with respect to the extent and uniformity of light emission. However, there are other advantages as well. For example, in a traditional channel-based linear luminaire, a flexible PCB that is thinner than the channel is centered in the channel during installation. This requires skill on the part of the assembler, or some form of jig or assembly tool, in order to ensure that the linear lighting is centered in the channel. By contrast, the PCB 32 and its LED light engines 34 are centered in the enclosure by design.

Additionally, in a traditional channel with linear lighting adhered to an interior surface, problems with the adhesive, such as incomplete adhesion or adhesive failure, can cause parts of the linear lighting to detach from the surface. This means that some of the LED light engines may be nearer to the light-emitting surface of the luminaire than others, resulting in visible hot spots. Not so with the luminaire 10.

Finally, as was explained above with respect to FIG. 6, the enclosure 12 and the PCB 32 are designed to be the same length, and they are also designed to be cut together in the field to the same length. This makes it much easier to ensure that the two components 12, 32 are actually the same length. By contrast, in a traditional channel-based luminaire, the linear lighting and the channel would typically need to be cut to the same length together in the factory, a process that often requires multiple, laborious steps of assembly and disassembly.

Linear luminaires according to embodiments of the present invention may take different forms, each with its own distinct advantages. For example, in the embodiment described above, the PCB 32 is positioned parallel to the outer surface 22 of the top 14 such that the LED light engines 34 emit directly through the top. However, there are many situations in which it is advantageous to reflect or refract the light from LED light engines before that light is emitted from a luminaire.

Figure 9:
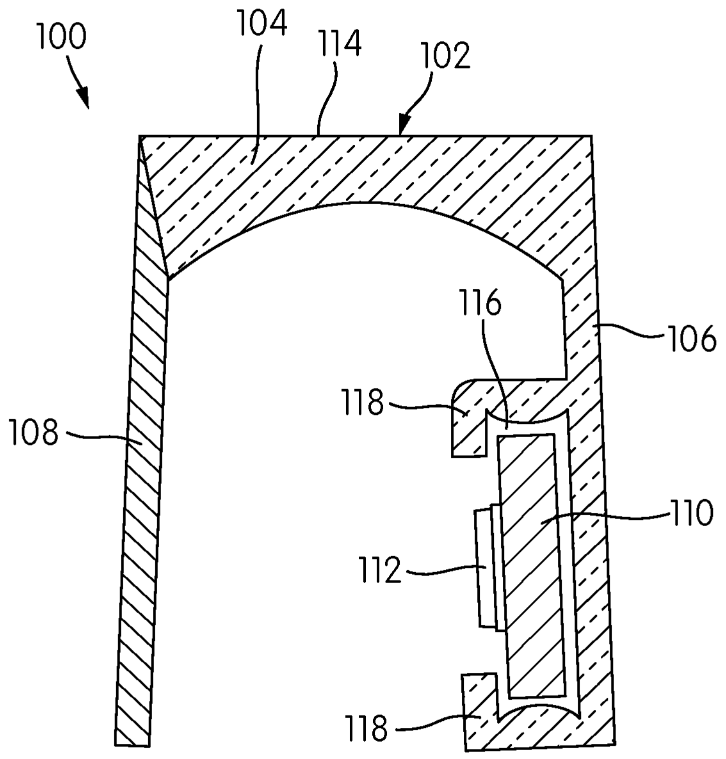
FIG. 9 is a cross-sectional view illustrating a linear luminaire according to another embodiment of the invention.

FIG. 9 is a cross-sectional view of a linear luminaire, generally indicated at 100, according to another embodiment of the invention. Like the linear luminaire 10 described above, the linear luminaire 100 has a three-sided body or enclosure 102 with a constant cross-section over its length. In some embodiments, the enclosure 102 may be made in the same way as the enclosure 12 described above: with a top 104 that is at least translucent and two generally opaque sidewalls. However, as can be seen in FIG. 9, the top 104 is transparent, as is one of the sides 106. Thus, the top 104 and transparent side 106 may be formed together as one piece made of the same material. The opposite sidewall 108 in this embodiment is opaque and may be reflective along its inner surface. For example, the opaque sidewall 108 may be white or have an internal reflective film or surface. This structure may be made by co-extrusion using the same sorts of materials described above, or the top 104 and transparent sidewall 106 may be joined to the opaque sidewall 108 by a second operation, as described above.

Another difference between the linear luminaire 10 and the linear luminaire 100 is that, in the linear luminaire 100, the PCB 110 that carries the LED light engines 112 is not positioned parallel to the outer surface 114 of the top 102. Rather, the sidewall 106 defines a PCB-carrying channel 116 with two mirror-image bracket structures 116 that extend inwardly from the inner sidewall 106 and make 90° turns to cup and contain a PCB 110 installed in the channel 116. As can be seen in FIG. 9, while the bracket structures 118 come up and over the upper surface of the PCB 110, they leave the LED light engines 112 exposed.

As compared with the PCB 32 described above, the PCB 110 may have all major components installed on its upper side, so that it can sit comfortably within the channel 116. The PCB 110 may use connectors like the connectors 38, 40 described above, or power and control conductors may be soldered to the PCB 110. The LED light engines 112 may be the same as, or different than, the LED light engines 34 described above. In general, the linear luminaire 100 may use any sort of LED light engines 112, or it may use multiple types of LED light engines.

The fact that the sidewall 106 is at least translucent may be mitigated somewhat by the fact that the opaque PCB 110 rests against much of its surface area. The PCB 110 and its LED light engines 112 are positioned to emit light toward the other sidewall 108. The sidewall 108 reflects the light, and ultimately, light is emitted out of the top 104. As was described above, this arrangement may result in more diffuse light emitted from the linear luminaire 100. In some cases, a linear luminaire 100 may have a PCB 110 with LED light engines 112 spaced at a wider pitch than the LED light engines 34 of the PCB 32 and achieve a similar light effect because the light from the LED light engines 112 is indirect and more diffuse when emitted.

One other difference between the linear luminaire 100 of FIG. 9 and the linear luminaire 10 described above lies in the cant of the sidewalls 106, 108. In the linear luminaire 10 described above, the two sidewalls 16 are generally parallel to one another. In the linear luminaire 100 of FIG. 9, this is not the case. Instead, the sidewalls 106, 108 are canted outwardly from the top toward the bottom, making the bottom of the linear luminaire 100 wider than its top 104.

The shape of the linear luminaire 100 has particular advantages and applications. The general advantage of luminaires 10, 100 according to embodiments of the invention is that they are simple in construction with a minimum number of parts and, in many cases, can be made quite small, with a minimal width and height. For example, the PCB 32, 110 may be on the order of 4 mm (0.16 in) wide, with a total luminaire width of about 10 mm (0.39 in).

Typically, these linear luminaires 10, 100 can also be made inexpensively, without the need for metalwork, anodizing, etc. These characteristics may make such luminaires 10, 100 perfect for inlaying into other materials, and for use with millwork. More generally, linear lighting can often be placed in locations where other, legacy forms of lighting cannot, and luminaires 10, 100 according to embodiments of the invention may be particularly well-adapted for placement in tight locations and small grooves.

Figure 10:
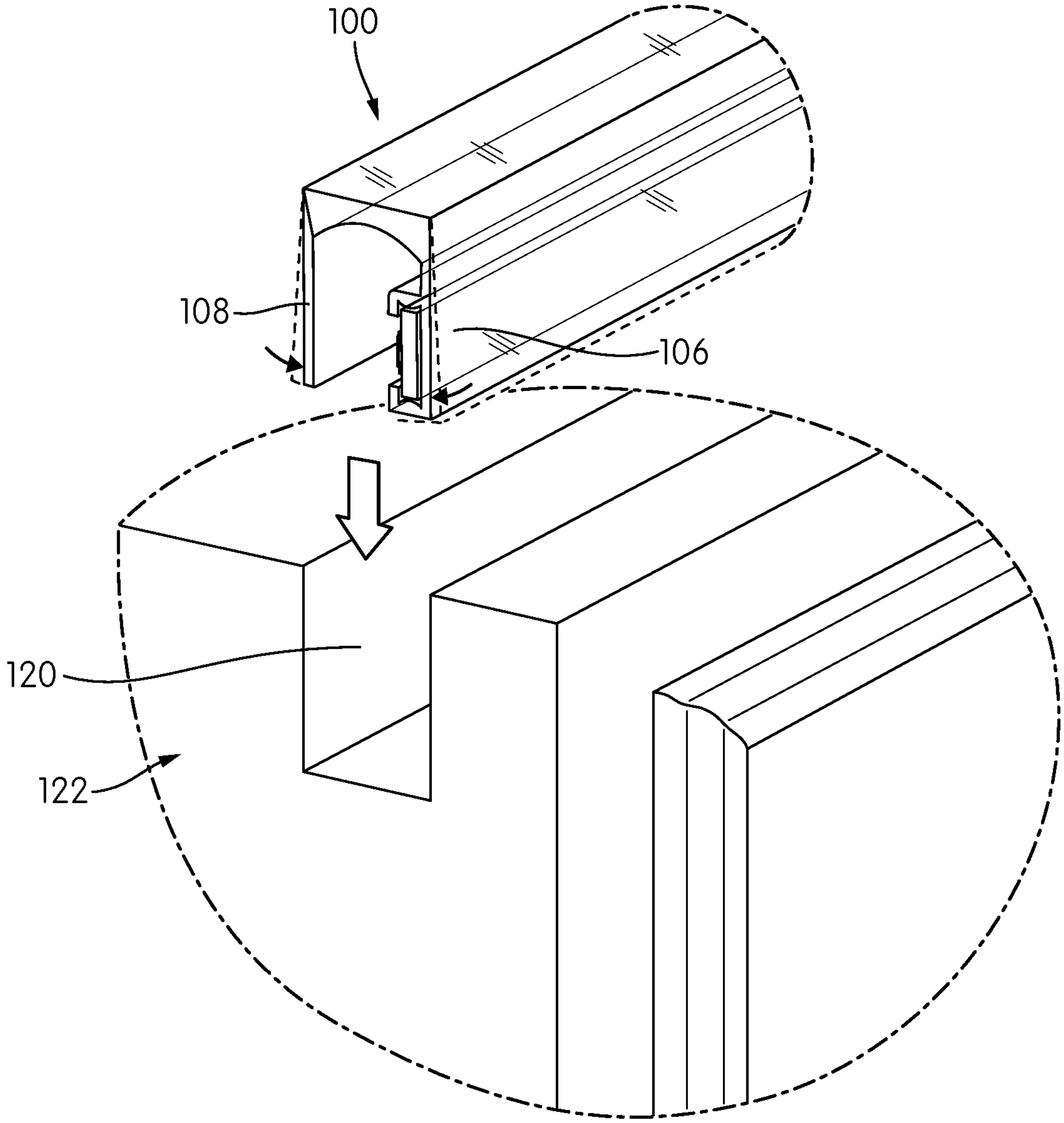
FIG. 10 is a perspective view, illustrating the insertion of the linear luminaire of FIG. 9 into a groove of another structure.

FIG. 10 is a perspective view illustrating one application for the linear luminaire 100. Specifically, the linear luminaire 100 is shown being inserted into a groove 120 in a structure, generally indicated at 122. Because the enclosure 102 is typically made of a resilient material that can deflect, the outwardly-canted sidewalls 106, 108 can be deflected inwardly, as shown in FIG. 10, to fit within a straight-sided groove 120. Once installed in the groove 112, the resilience of the material of the enclosure 102 causes the sidewalls 106, 108 to push outwardly, exerting pressure on the sidewalls of the groove 120, thereby increasing frictional forces and helping to secure the enclosure 100 within the groove. The structure 122 in which the groove 120 is defined may be a door, a countertop, a piece of decorative millwork, or any other structure in which it is desirable to inlay a linear luminaire 10.

As may be appreciated from FIG. 10, if the structure 122 is made of an opaque material, then the fact that one of the sidewalls 106 is at least translucent may be immaterial, as little to no light will leak from the sides of the groove 120, especially if the fit between the luminaire 100 and the groove 120 is a tight, frictional fit. Moreover, depending on the particular characteristics of the installation, the groove 120 may fit the linear luminaire 100 tightly enough at its ends that no endcaps are required.

Figure 11:
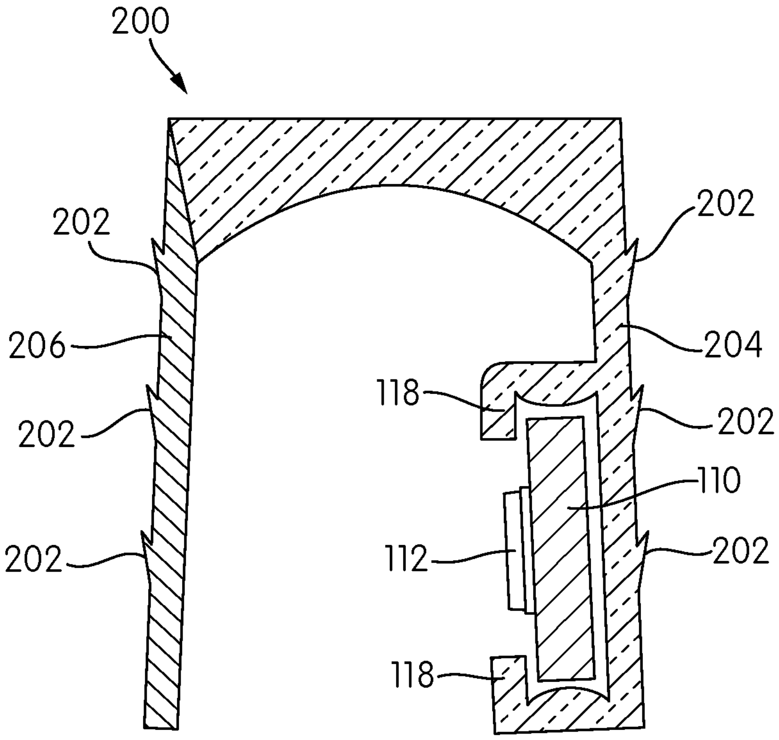
FIG. 11 is a cross-sectional view similar to the view of FIG. 9, illustrating yet another embodiment in which the linear luminaire has structure on its sides to increase friction or grip when used in a groove or as an inlay.

In some cases, additional structure may be provided in order to allow a linear luminaire to better grip and remain in a groove 120. FIG. 11 is a cross-sectional view of a linear luminaire 200 that is essentially identical to the linear luminaire 100 described above but for the inclusion of gripping structure, in this case, barbs 202, on the outer surfaces of both sidewalls 204, 206. If barbs 202 are used, they may be directionally-oriented such that they allow for easy insertion but make it difficult for the linear luminaire 200 to fall out of, or be extracted from, the groove 120. As with the linear luminaire 100, the linear luminaire 200 has an outward cant to its sidewalls 204, 206 to exert pressure against the sidewalls of the groove 120, thereby increasing frictional forces and, presumably, the effectiveness of the barbs 202. Of course, gripping structure need not be directionally oriented. As was noted briefly above, omnidirectional surface roughening may be used on the sidewalls 204, 206. In some cases, both barbs 202 and omnidirectional surface roughening may be used.

In FIG. 11, and in certain figures that follow, the PCB is referred to as PCB 110 and its LED light engines as LED light engines 112. The reference numerals used for certain other components are also consistent throughout the following description and drawing figures, although many of the figures depict different embodiments of the invention. This is done for clarity and to avoid a plethora of reference numerals. However, as those of skill in the art would understand, in some cases, the referenced features may be different from embodiment to embodiment.

Figure 12:
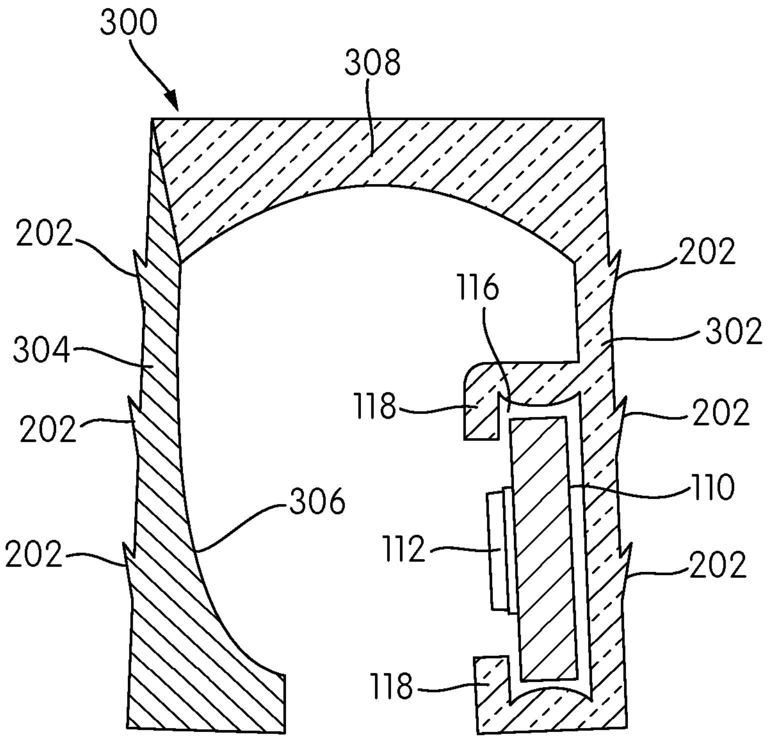
FIG. 12 is a cross-sectional view similar to the view of FIG. 11, illustrating a further embodiment in which a luminaire includes structure to collect and focus emitted light.

FIG. 12 is a cross-sectional view similar to the view of FIG. 11, illustrating another linear luminaire, generally indicated at 300, that has all of the features described above with respect to the luminaires 100, 200 of FIGS. 9-11. However, in those luminaires 100, 200, the light from the LED light engines 112 reflects from the opposite sidewall with no special attempt made to focus or direct that light. By contrast, in the linear luminaire 300, the PCB 110 with LED light engines 112 is held in a channel 116 along one sidewall 302 and emits light toward the other sidewall 304. However, sidewall 304 has an inner reflective face 306 that is curved in such a way as to direct the reflected light toward the top 308. The exact curvature used on the inner reflective face 306 will depend on the particular dimensions and proportions of the linear luminaire 300, as well as other factors, and may be any that causes or allows at least a portion of the light rays emitted from the LED light engines 112 to be directed toward the top 308. As shown, in the illustrated embodiment, the sidewall 304 is thickened toward the bottom and the inner reflective face 306 curves inwardly, extending toward the opposite sidewall 302 and giving the luminaire 300 a smaller bottom opening than in other embodiments. The inner reflective face 306 may be white for reflection, or it may have a surface that is roughened or adapted in some way to diffuse the light.

Thus, when a linear luminare 300 according to an embodiment of the invention is arranged as shown in FIG. 12, i.e., such that the light from the LED light engines 112 will reflect off of another surface 306 before being emitted, that surface 306 may be configured, adapted, or modified to focus or direct that light in some manner. As was noted briefly above, the desired result may be, e.g., more even distribution of light or greater diffusion when the light is emitted from the top 308, or from whatever other emitting surface or area the luminaire might have.

The linear luminaires 100, 200, 300 described above primarily use reflection to modify the light emitted from the LED light engines 112. Refraction may also be used, as may combinations of reflection and refraction.

Figure 13:
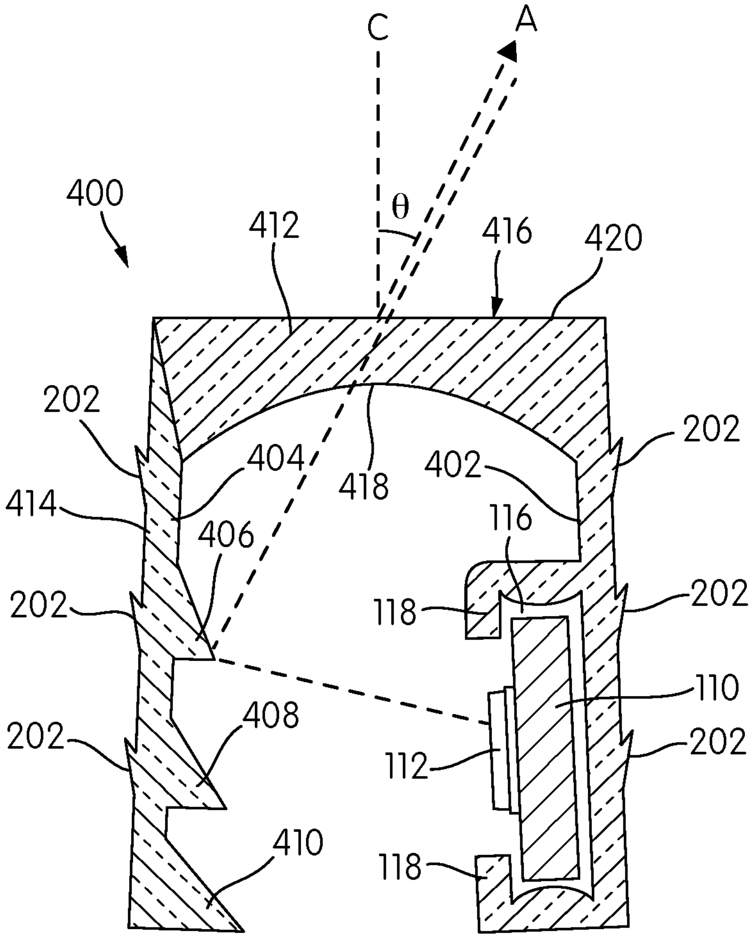
FIG. 13 is a cross-sectional view similar to the view of FIG. 12, illustrating another further embodiment in which a luminaire includes refractive structure to direct emitted light.

FIG. 13 is a cross-sectional view of a linear luminaire, generally indicated at 400, according to yet another embodiment of the invention. As above, a PCB 110 is mounted in a bracketed channel 116 along one sidewall 402, with LED light engines 112 oriented to emit light toward the opposite sidewall 404. In this case, however, the sidewall 404 is not merely reflective; it includes a number of refractive facets 406, 408, 410 that are intended to direct incident light in a particular fashion. For example, the goal may be to create a narrow beam of light centered around an axis A that is offset by an angle θ from the centerline C of the top 412. That beam could have a beam width, for example, of 10°, 20°, 30°, 45°, 60°, etc., measured full-width, half-maximum (FWHM). FWHM, as that term is used here, means that the beam width is measured from edge to edge, and at the edges, the luminous flux is half the luminous flux at the center of the beam. This is in contrast to the properties of the light from a typical LED light engine 112, which usually as a beam width of about 120° and is Lambertian, with the apparent brightness the same from any viewing angle.

The inner sidewall 404 and its facets 406, 408, and 410 are light-transmissive and are usually at least translucent, although they will often be fully transparent. If needed, the outer surface 414 of the sidewall 404 may be silvered or otherwise coated to keep light within the sidewall 404. This means that the entire enclosure 416 may be made of the same transparent material in some cases. However, in other cases, areas around or adjacent to the facets 406, 408, 410 may be made of an opaque material in order to prevent the light from escaping other than through the optical path defined by the facets 406, 408, 410.

The facets 406, 408, 410 themselves may be of any number, and they may define any angles with respect to the surface of the sidewall 404. The facets 406, 408, 410 operate in the same general way as the facets of a Fresnel lens: when one wishes to refract light, only the interfaces between the refractive material and the air actually matter; the amount of material between the interfaces does not. Whereas a traditional Fresnel lens uses sets of regular, often concentric, facets to focus or diverge light rays, the facets 406, 408, 410 are irregular, typically non-identical sets of refractive facets that refract some rays of light more than others, causing the beam of light as a whole to have the desired characteristics of beam width and direction. The facets 406, 408, 410, like the other features of the enclosure 416, will typically run the full length of the enclosure 416. Each facet 406, 408, 410 will have a length and an angle appropriate for the particular rays it is intended to refract, which means that the facets 406, 408, 410 taken as a whole will often have an irregular sawtooth appearance.

U.S. Patent Application Publication No. 2022/0228723, the contents of which are incorporated by reference herein in their entirety, describes a faceted cover for linear lighting that is intended to create a narrower beam width directed off-center, as well as the process of designing such features. As those of skill in the art will appreciate, the design process typically involves defining a few principal rays and using Snell's Law to calculate the necessary facet lengths and angles to achieve the desired end result.

In the present case, there are three structures that can refract light: the facets 406, 408, 410, the inner surface 418 of the top 412, and the outer surface 420 of the top 412. The design process for the facets 406, 408, 410 may encompass or include any of those structures. More particularly, the design process may use assumptions about how much of the necessary refraction is caused by the various refractive structures as design guidelines or constraints. For example, the design process may assume that 50% of the necessary refraction is caused by the facets 406, 408, 410 and 50% of the necessary refraction is caused by the surfaces 418, 420 of the top 412. In other embodiments, it may be assumed that all of the necessary refraction is caused by the facets 406, 408, 410 and that the surfaces 418, 420 of the top do not cause significant refraction. For this reason, in some cases, the surfaces 418, 420 of the top 412 may be faceted or contoured to cooperate with the facets 406, 408, 410 in order to produce a particular optical effect, while in other cases, the facets 406, 408, 410 may cause the necessary refraction without substantial refractive involvement from the top 412. This is in much the same way that reflection from a sidewall 108, 206, 306 may be coordinated with refraction in the top 104, 308 in the other luminaires 100, 200, 300.

The linear luminaires 100, 200, 300, 400 described above all have the outwardly-canted sidewalls described above with respect to the linear luminaire 100 of FIG. 9. However, any of the features described in those luminaires may be implemented on linear luminaires without canted sidewalls.

Figure 14:
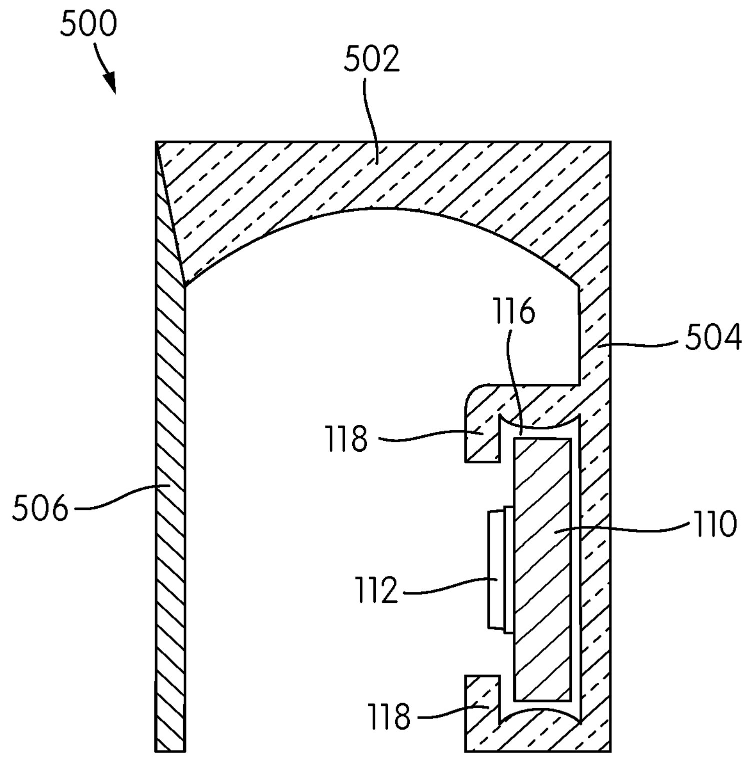
FIG. 14 is a cross-sectional view similar to the view of FIG. 13, illustrating yet another further embodiment of a linear luminaire.

As one example, FIG. 14 is a cross-sectional view of a linear luminaire, generally indicated at 500, according to a further embodiment of the invention. The linear luminaire 500 has essentially the same features as the luminaire 100 described above. Specifically, the top 502 and one sidewall 504 are made of the same light-transmitting material, and a PCB 110 with LED light engines 112 is held in a channel 116 on a sidewall 504 by bracket structure 118. The LED light engines 112 are oriented to emit toward the other sidewall 506, which may be white-colored with an additive, silvered, or otherwise rendered reflective. In many embodiments, the top 502 and sidewall 504 may be co-extruded with the other sidewall.

The difference between the linear luminaire 500 and the linear luminaire 100 of FIG. 9 is that the linear luminaire 500 has straight, parallel sidewalls 504, 506. There is no deliberate cant introduced in the sidewalls 504, 506.

Many of the linear luminaires 100, 200, 300, 400, 500 designed for groove insertion are open along their bottom. As was explained above, this makes it easy to deflect the sidewalls inward for insertion into a groove, and it may also simplify manufacturing. As was also explained above, if the groove 120 is a tight fit for the linear luminaire 100 and there are no particular concerns about ingress protection, this may be particularly advantageous and expedient.

However, a linear luminaire of this type may also be closed. Depending on the embodiment, this may mean that the enclosure is manufactured as a four-sided rectangular tube, or it may mean that, as in the linear luminaire 10 described above, the PCB or other structure serves to close the enclosure along at least one side.

Figure 15:
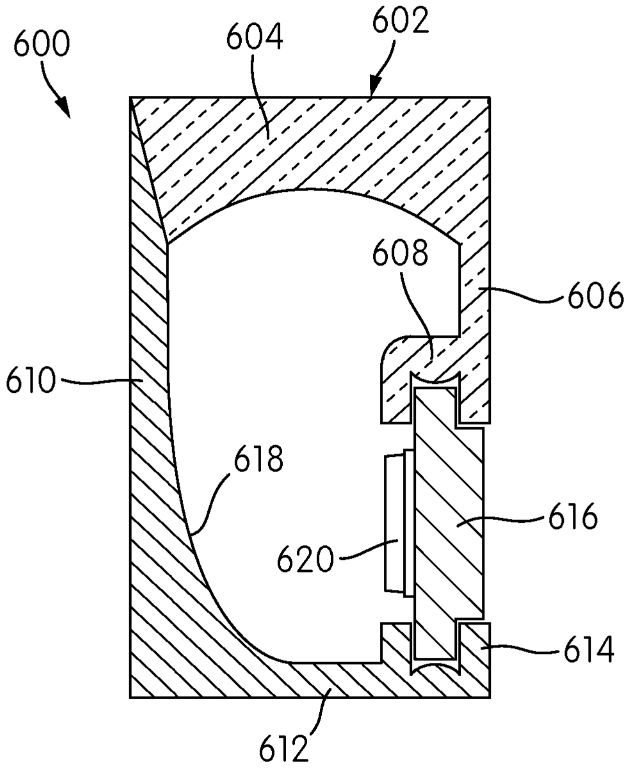
FIG. 15 is a cross-sectional view similar to the view of FIG. 14, illustrating a closed luminaire according to an embodiment of the invention.

A variation on this concept is shown in FIG. 15, a cross-sectional view of a luminaire, generally indicated at 600, according to yet another further embodiment of the invention. The luminaire 600 has a sidewall-mount configuration with an open, three-sided enclosure 602. That is, the enclosure 602 has a top 604 made of a light-transmissive material which makes a 90° turn on one side to define a portion 606 of a sidewall. The sidewall portion 606 includes PCB-carrying structure 608 at its furthest extent. In this embodiment, the PCB-carrying structure 608 is an inverted, U-shaped channel.

On its other side, the top 604 meets with a complete sidewall 610 that is made of an opaque or reflective material. As above, the sidewall 610 may be co-extruded with the top and sidewall portion 606, e.g., made of the same basic material with a different additive or additives. The parts 604, 610 may also be joined by a second operation after manufacture.

The sidewall 610 makes a 90° turn to become a bottom side 612 that extends toward the sidewall portion 606. When the bottom side 612 reaches the position of the sidewall portion 606, it makes another 90° turn, terminating in PCB-carrying structure 614 complementary to the PCB-carrying structure 608 of the sidewall portion 606. In this case, the PCB-carrying structure 614 is a U-shaped channel aligned with the inverted U-shaped channel 608 of the sidewall portion 606. The complementary structures 608, 614 form a channel to carry a PCB 616. The PCB 616 in this case is inserted on its side such that its LED light engines 618 emit toward the sidewall 610, and the opening provided for it is dimensioned such that the PCB 616 closes the enclosure 602. The PCB 616 in this embodiment is T-shaped. In other embodiments, the PCB 616 may be particularly shaped to close the opening in the enclosure 602 in some other manner. As with the other PCBs 32, 110 disclosed here, the PCB 616 is a rigid PCB.

This sort of closed linear luminaire 600 may have the kinds of light-directing features described above. In this particular embodiment, the sidewall 610 has a curved inner surface 618 intended to reflect and direct light emitted by the LED light engines 620 toward the top 604, where it is emitted out of the linear luminaire 600.

The design shown in FIG. 15 has an additional advantage: because half of the thickness of the PCB 616 is embedded in the sidewall portion 606, the luminaire 600 can be narrower than other luminaires according to embodiments of the invention while maintaining the same, or almost the same, photometric performance. For example, if the PCB 616 is 4 mm thick and the sidewall portion 606 is 2 mm thick, the luminaire 600 can be 2 mm narrower than other comparable luminaires.

Each of the above embodiments uses a single PCB 32, 110, 616. It is possible that in some embodiments, multiple PCBs 32, 110, 616 could be used. For example, the luminaires 100, 200, 500 described above could be adapted such that their two sidewalls are mirror images of one another, with bracket or channel structure 118 for holding a PCB 110 provided on each sidewall, and a PCB 110 installed along each sidewall. In this kind of embodiment, there would be two PCBs 110 arranged such that the LED light engines 112 on each PCB 110 emit toward the opposite sidewall. The use of two PCBs 110 may result in greater luminous flux and more apparent brightness out of the resulting luminaire, as well as more uniformity in light emission.

All of the above embodiments are adapted to operate at low voltage. The advantage of low voltage is that safety concerns are reduced relative to high-voltage systems. However, to convert, e.g., from high-voltage alternating current (AC) power to low-voltage direct current (DC) power, an additional element is required. That element, often referred to as a driver, is typically a switched-mode power supply.

Drivers are unloved. Referred to in the industry and by the public as "bricks," "wall worts," and worse, they are one more element that an installer must find space for while installing a low-voltage lighting system. Moreover, drivers sometimes fail before other components of the lighting system, meaning that the space in which they are placed must be accessed and the driver repaired or replaced to return the lighting system to function.

To avoid these issues, there are forms of linear lighting designed to operate at high voltage. For example, U.S. Pat. No. 9,784,421 describes a strip of linear lighting that is designed to operate at high voltage. The strip of linear lighting carries rectifiers to perform a rough conversion of AC power into a form of DC power. That patent also discloses the use of capacitive filters to smooth the incoming power signal. However, integrating some of the functionality of a driver into the linear lighting itself increases the cost and complexity of the linear lighting, as well as the number of components that could potentially fail in use. Additionally, complex circuitry in linear lighting may make that linear lighting incompatible with typical lighting controls, such as dimmers.

Figure 16:
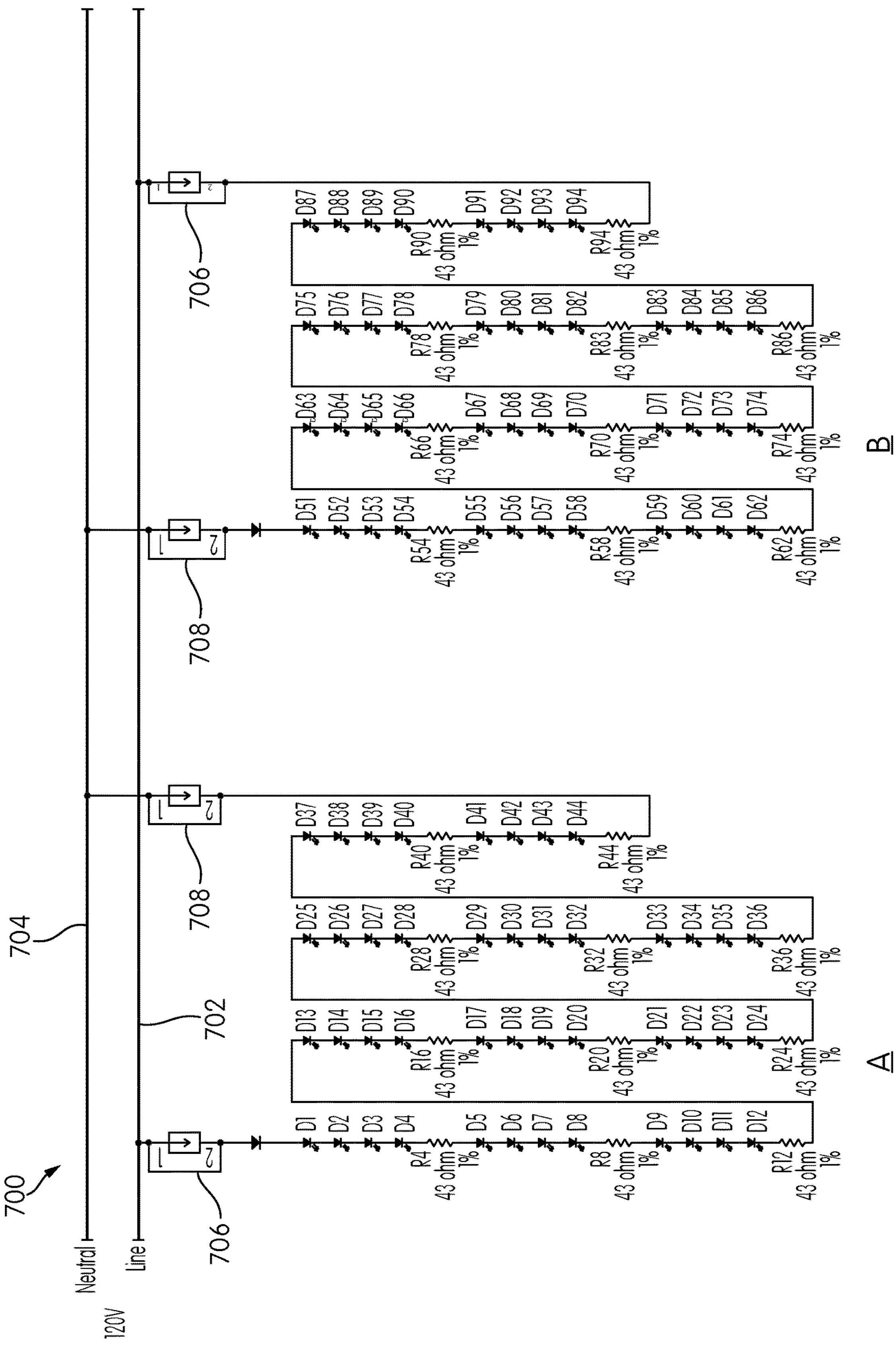
FIG. 16 is a circuit diagram for a high-voltage linear luminaire according to another further embodiment of the invention.

FIG. 16 is a circuit diagram of the PCB of a high-voltage linear luminaire 700. As will be described below in more detail, the high-voltage linear luminaire of FIG. 16 shares many of the physical characteristics of the low voltage linear luminaires described above. The main difference between the linear luminaire 700 and the linear luminaires described above lies in the power that it is designed to accept; specifically, the high-voltage linear luminaire 700 is designed to accept high-voltage AC power, in this case, 120 VAC. With minor adaptations, higher and lower voltages can be used, as will be described below.

Notably, the high-voltage linear luminaire 700 carries no switched-mode power supply, transformer, rectifier, filter, or other circuitry to convert high-voltage to low-voltage, or DC power to AC power. Rather, the LEDs themselves are arranged in such a way, electrically and physically, that they can accept AC power directly to provide light.

As with other high-voltage AC systems, two high-voltage wires 702, 704 are connected to the luminaire 700 by connectors 706, 708 mounted on its PCB, as will be described below in more detail. These high-voltage wires 702, 704 may be the typical high-voltage wires in a household or commercial 120V power system, and this description will refer to them as the line wire 702 and the neutral wire 704, in keeping with traditional nomenclature.

Two series of LED light engines, marked A and B in the schematic of FIG. 16, connect to the line and neutral wires 702, 704 via the connectors 706, 708. The LEDs of series A are marked as D1-D44 in the diagram of FIG. 16, and the LEDs of series B are marked as D51-D94, for a total of 44 LEDs in each series A, B. In order to protect the LEDs D1-D94 from being reverse-biased, each series A, B is connected to the wires 702, 704 through a diode D45, D46. These protective diodes D45, D46 may have a small forward voltage, e.g., 1.1V, and a large reverse voltage, e.g., 600V.

Series A and B differ in how they are connected to power. Specifically, series A is arranged such that the anodes of the LEDs D1-D44 are connected to the line wire 702 and the cathodes of the LEDs D1-D44 are connected to the neutral wire 704. This means that the LEDs D1-D44 are arranged to be forward-biased and emit light when the voltage on the line wire 702 is positive. For series B, the arrangement is the opposite: the anodes of the LEDs D51-D94 are connected to the neutral wire 704 and the cathodes of the LEDs D51-D94 are connected to the line wire 702. This means that the LEDs D51-D94 of series B are arranged to be forward-biased and emit light when the voltage in the neutral wire 704 is positive.

In an AC cycle, the voltage is positive for half of each cycle and negative for the other half of the cycle. With the power connections shown in FIG. 16, when typical AC power is applied, the LEDs D1-D44 of series A will be on for about half of each AC cycle, and the LEDs D51-D94 of series B will be on for about half of each AC cycle. (Here, the term "about half" is used because the AC voltage must rise at least high enough to forward bias one of the protective diodes D45, D46 and one of the series of LEDs D1-D94 before light is emitted.)

Thus, at almost any given point in an AC power cycle, the linear luminaire 700 should be emitting light. As those of skill in the art will appreciate, though, it is helpful to consider the physical arrangement of the LEDs of series A and series B on the PCB in any linear luminaire 700. For example, if all of the LEDs D1-D44 of series A are grouped on one side of a PCB and all the LEDs D51-D94 are grouped on the other side of the PCB, then half of the resulting linear luminaire 700 will be dark at any given time, potentially causing noticeable flicker.

Figure 17:
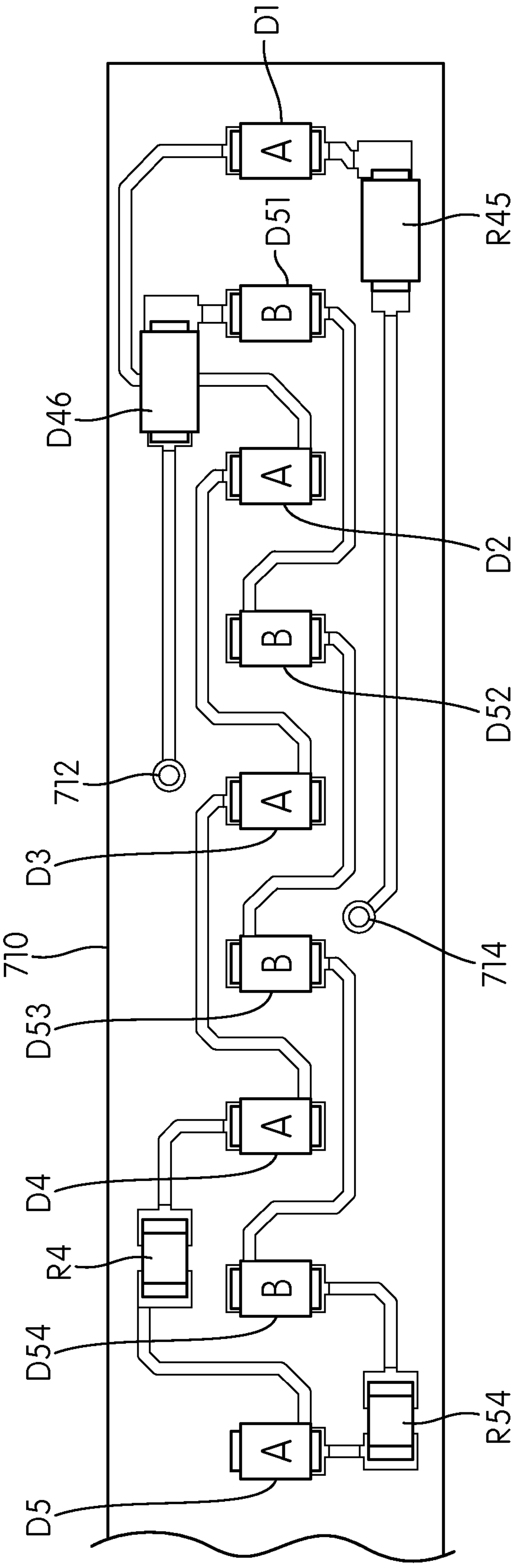
FIG. 17 is a top plan view of a portion of the PCB of the linear luminaire of FIG. 16, illustrating the arrangement of the LEDs thereon.

FIG. 17 is a schematic view of a portion of a PCB 710 for a linear luminaire 700 that illustrates one useful arrangement: the LEDs D1-D44 of series A and the LEDs D51-D94 are interdigitated with one another along the length of the PCB 710. That is, the LEDs D1-D44 of series A and the LEDs D51-D94 of series B are arranged in A-B-A-B fashion along the length of the PCB 710. This may make any potential flicker less noticeable, particularly if the LEDs D1-D94 are small and placed at a tight pitch (i.e., a close spacing) relative to one another. Of course, the physical arrangement need not be a strict A-B-A-B interdigitation; depending on the embodiment, other patterns may be used, e.g., AA-BB-AA-BB, A-BB-A-BB, BB-A-BB-A, etc.

While the LEDs D1-D94 may be packaged in any kind of package, as the above description implies, in many applications, it can be helpful to use small LED packages, so that the LEDs D1-D94 can be packed together at a tight pitch. For example, in one embodiment, the LEDs D1-D94 may be packaged in 2110 surface-mount packages.

As with any luminaire based on LEDs, the linear luminaire 700 requires some component or set of components to set the current in the circuit. That component may be either a current-setting integrated circuit (IC) or a resistor. In embodiments of the invention, each series A, B of LEDs includes at least one resistor. As those of skill in the art know, any single resistor may be replaced by some number of smaller resistors in series. Thus, while one resistor may be used in some cases, in many embodiments, the necessary resistance will be divided among multiple resistors. The main advantage of using multiple, smaller resistors instead of one large resistor lies in heat dissipation—each resistor generates heat, and providing many smaller resistors over the length of the PCB 710 makes it easier to dissipate that heat. Using multiple resistors also avoids a situation in which one component on the PCB 710 produces so much heat that it causes damage.

FIG. 16 illustrates that in each series A, B, multiple resistors are used to set the current. In particular, series A includes 11 resistors, indicated as R4, R8, R12, R16, R20, R24, R28, R32, R36, R40, and R44. Series B also includes 11 resistors, indicated as R54, R58, R62, R66, R70, R74, R78, R83, R86, R90, and R94. This equates to one resistor for every four LEDs D1-D94.

The total resistance value in the circuit will vary slightly based on a number of factors, chiefly the applied voltage and the expected degree of fluctuation or variance in the peak voltage. If the peak voltage is, e.g., 120V, a reasonable circuit designer may expect that peak voltage to fluctuate, e.g., about 5%, meaning that the lighting circuit should allow the LEDs D1-D94 to operate with a reasonable luminous flux (i.e., with a reasonable apparent brightness) at 120V, but should also operate without too much current at 126V or too little current at 114V. In the illustrated embodiment, each resistor has a resistance value of 43Ω (with a 1% tolerance), giving each series A, B a total resistance of 473Ω. In some cases, slightly more resistance may be used, e.g., with each resistor having a resistance of 47Ω.

Physically, the linear luminaire 700 may share the same form and about the same dimensions as the linear luminaires described above. Some changes may be made, however, in view of the high-voltage AC power used by the linear luminaire 700. For example, as shown in FIG. 17, a top plan view of a portion of the PCB 710 of the linear luminaire 700, components other than the LEDs D1-D94 are mounted on the upper surface of the PCB 710. More particularly, the protective diodes D45, D46 can be seen near one end of the PCB 710, each connected to the underside of the PCB 710 through a via 712, 714. Two of the resistors R4, R54 can also be seen in the view of FIG. 17. However, as with the linear luminaires described above, components other than LED light engines may be placed on the upper surface or the lower surface of the PCB 710, so long as appropriate connecting structures, like vias, are provided. The components on the PCB 710 are surface mounted, although other forms of mounting may be used.

Figure 18:
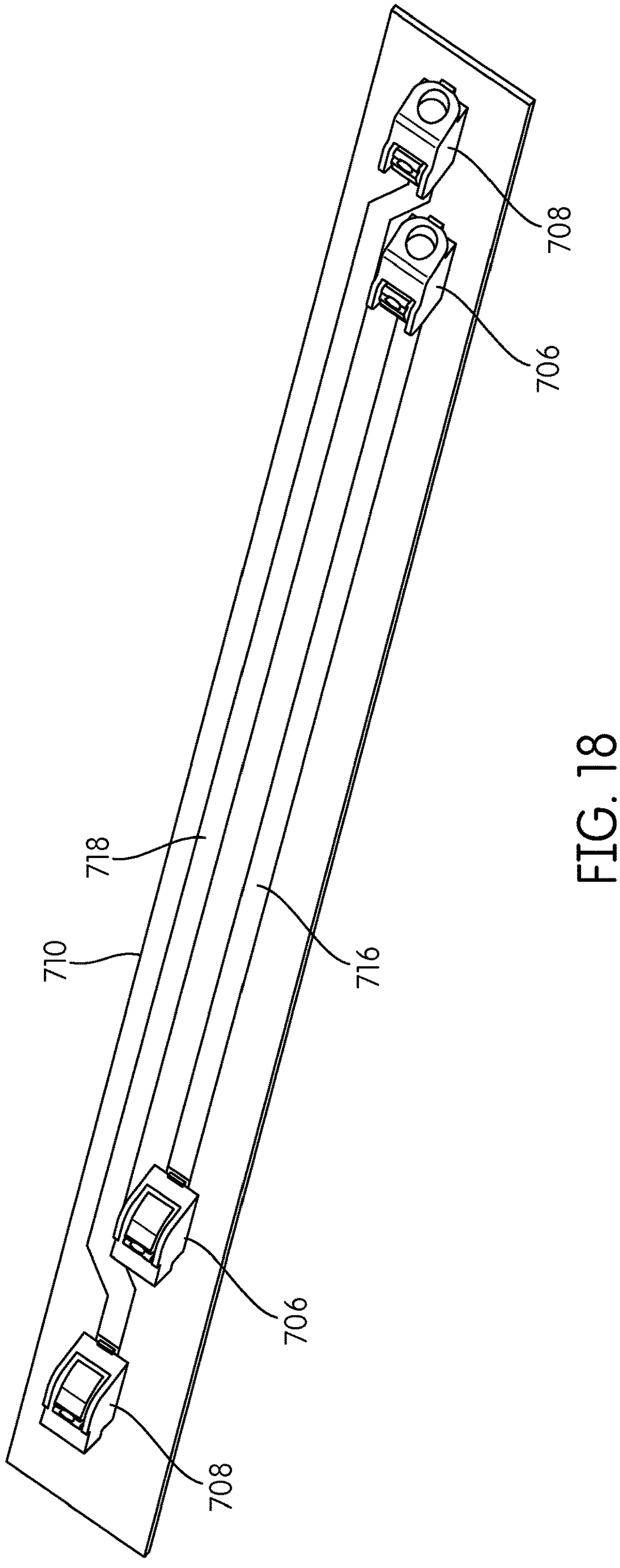
FIG. 18 is a bottom perspective view of the PCB.

FIG. 18 is a perspective view of the underside of the PCB 710. As with other embodiments, the connectors 706, 708 that connect with the high-voltage wires 702, 704 are surface-mounted and staggered in position along the length of the PCB 710. In order to allow several PCBs 710 to be connected in series, two pairs of connectors 706, 708 are provided, one pair 706, 708 at each end of the PCB 710. The pair of line and neutral connectors 706, 708 at one end of the PCB 710 can, for example, receive power. The pair of line and neutral connectors 706, 708 at the other end of the PCB 710 can transmit that power to the next PCB 710 in the series. Two relatively wide conductive paths 716, 718 are defined in the PCB 710 e.g., with a metal like copper, aluminum, or gold, and run between like connectors 706 or 708, essentially serving as power bus lines for the PCB 710. The conductors themselves may be, e.g., surface-mounted, push-button terminal block connectors, like WAGO 2060-471/998-404 connectors (Wago Corporation, Germantown, Wisconsin, United States). The connectors 706, 708 may be color-coded in a traditional or typical scheme to indicate which connector 706, 708 is to receive the line wire 702 and which connector 706, 708 is to receive the neutral wire. For example, the connectors 706 that receive the line wire 702 may be colored black, with the other connectors 708 colored white. The connectors 706, 708 may be particularly adapted to receive conductors from double-insulated electrical wire, like type NM (i.e. ROMEX®) wire.

With this arrangement, a PCB 710 that includes interdigitated series A and B spaced at a consistent pitch might be, e.g., about 6 inches (15 cm) long. If a linear luminaire 700 is to be made longer, the PCB 710 could be arranged in repeating blocks, as was described above, with one repeating block including both a series A and a series B, as shown in FIGS. 16-17. As those of skill in the art will appreciate, the actual number of LEDs that is used in any embodiment will depend in large part on the forward voltages of the LEDs and the magnitude of the applied voltage. Higher applied voltages will generally use more LEDs, and more LEDs will also be used if the LEDs have lower voltages.

The circuit illustrated in FIG. 16 assumes a 120 VAC applied voltage and LEDs D1-D94 with a forward voltage of about 3V each, with only half of the LEDs D1-D94 exposed to the applied voltage at any one time. A forward voltage of about 3V is common in blue-light-emitting LEDs, as well as in blue-pump LEDs. If, for example, red or green LEDs are used instead of blue LEDs, more of those LEDs would be required, because both red and green LEDs have lower forward voltages than blue LEDs.

In addition to single-color LEDs, so-called RGB LEDs, which include a red, a green, and a blue LED in a single package, may be used. With RGB LEDs, each color typically requires its own current-setting elements; thus, a single RGB LED package may be connected to three resistors.

The linear luminaire 700 may use the same type of three-sided enclosure as that shown in FIGS. 1-2, and that three-sided enclosure may have the same features as the three-sided enclosure 12. The PCB 700 would close that type of enclosure along its open fourth side.

Local electrical safety regulations, or general prudence, may dictate that the linear luminaire 700 include structure adapted to protect installers and users from the high voltage on the PCB 710. For example, in order to avoid the possibility that endcap adhesive failure could expose the PCB 710, the endcaps for the three-sided enclosure could use the mechanical securement apparatus shown in FIGS. 7 and 8. Moreover, the brackets 62 that support the endcaps 60 may be elongated so that they collectively run the entirety, or nearly the entirety, of the enclosure 12. With the brackets 62 extending along the entire raceway, the PCB 710 would be fully shielded from exposure along the raceway. Additionally, a mechanical strain relief may be added to the endcap 60 and/or to the cable carrying the high-voltage line and neutral wires 702, 704. Finally, with a high-voltage linear luminaire 700, the components, including the PCB 710, the three-sided enclosure, the endcaps, and any bracket or brackets used to shield the PCB 710, may be rated to handle the applied voltage, and all relevant components may be made to meet appropriate flammability standards.

In the foregoing description, the term "three-sided enclosure" is used to describe the nature of the open enclosure used in the embodiments. However, this does not necessarily mean that each embodiment must have an identifiable top and two depending, parallel or canted sidewalls. Open enclosures of other types are possible in accordance with embodiments of the invention. For example, instead of an enclosure 10, 100 that makes two 90° turns, the enclosure may have a continuous or piecewise-continuous curvature that transitions gradually from the aspect along which light is emitted to sidewall-like aspects. For example, an enclosure with a semicircular cross-sectional shape would meet this description. In that case, the open portion of the semicircular cross-section would be closed with a PCB 32, much as in the linear luminaire 10. The term "three-sided enclosure" should be read broadly enough to encompass these types of enclosures.

Figure 19:
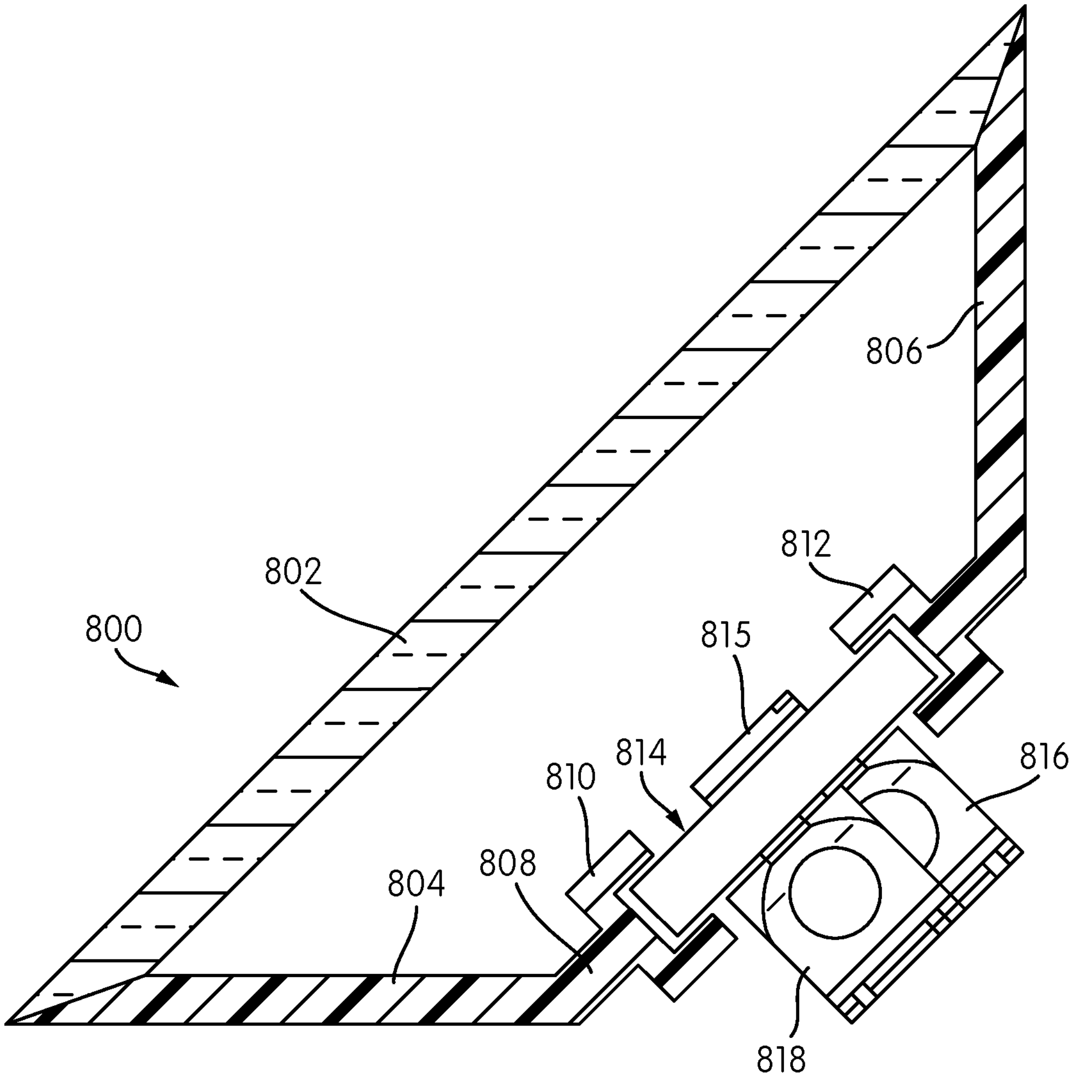
FIG. 19 is a cross-sectional illustration of a trapezoidal linear luminaire according to yet another further embodiment of the invention.

Enclosures according to embodiments of the invention may also have more sides. FIG. 19 is a cross-sectional view of a luminaire, generally indicated at 800, according to another embodiment of the invention. The luminaire 800 is trapezoidal in overall cross-section, with a translucent emitting surface 802 and opaque sidewalls 804, 806 that cant inwardly from the side edges of the emitting surface 802. Away from the emitting surface 802, the sidewalls 804, 806 turn inward, defining a shorter fourth side 808 generally parallel to the emitting surface 802. The fourth side 808 is open and has receiving structures 810, 812 that define a slot for receiving a PCB 814 with LED light engines 815 disposed on it.

In the embodiment of FIG. 19, the PCB 814 may be assumed to be one of the same PCBs 32, 710 described above, but it need not be. In particular, the PCB 814 may operate at either low voltage or high voltage. Like the PCBs 32, 710 described above, the PCB 814 is narrow, rigid and closes the luminaire 800 along the fourth side 808. Like the PCBs 32, 710 described above, the PCB 814 has staggered connectors 816, 818 for making electrical connections. With the arrangement shown in FIG. 19, the LED light engines 815 on the PCB 814, emit toward the emitting surface 802.

As with other embodiments, the translucent emitting surface 802 would typically be co-extruded with the sides 804, 806, 808 from a plastic, although the parts may be made separately and attached later by the kinds of joining techniques described above.

Like the embodiments described above, endcaps may be attached to the luminaire 800 by simply adhering them to the ends, or by some other means of securement. The luminaire 800 may also be placed tightly in a groove or other form of millwork that makes endcaps unnecessary.

Although a trapezoid is shown in FIG. 19, luminaires may be constructed with various polygonal and other cross-sectional shapes. As the luminaire 800 of FIG. 19 illustrates, essentially any cross-sectional shape with an open side can be closed by a rigid PCB that carries LED light engines.

Figure 20:
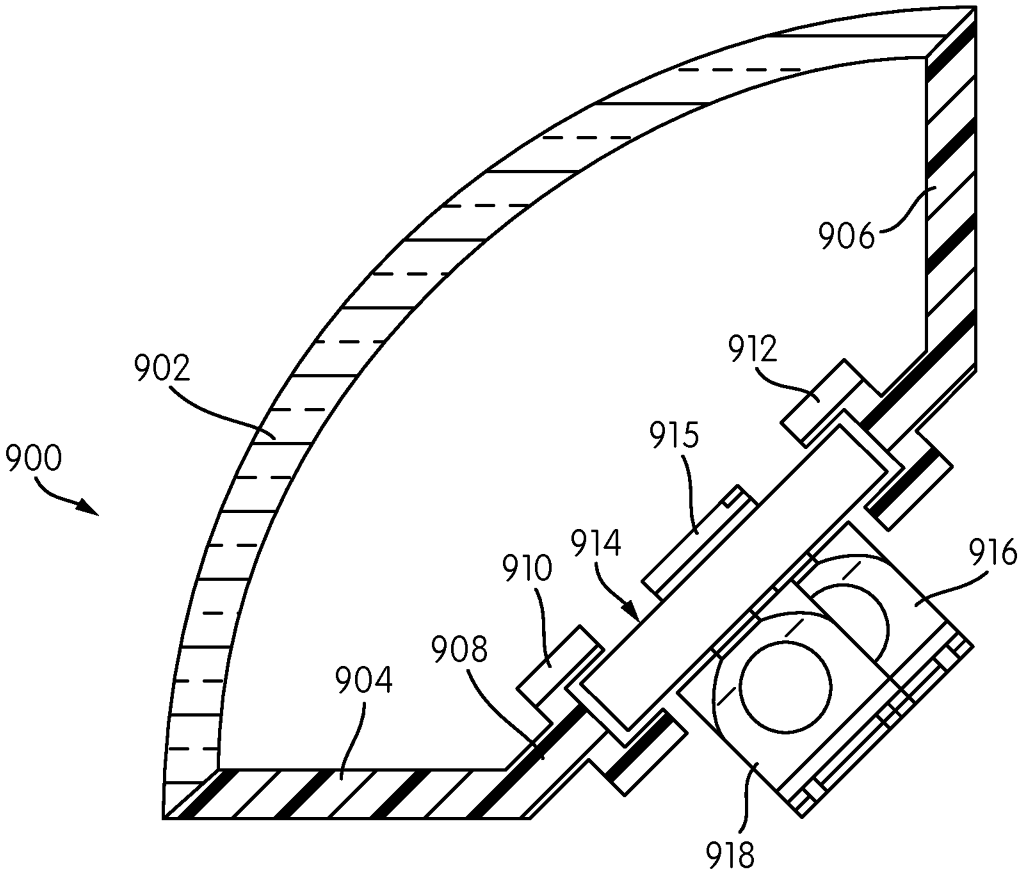
FIG. 20 is a cross-sectional illustration of a quarter-round linear luminaire according to yet another further embodiment of the invention.

FIG. 20 is a cross-sectional view of another luminaire, generally indicated at 900, according to yet another embodiment of the invention. The luminaire 900 has a curved, quarter-round translucent emitting surface 902. (Here, "quarter-round" refers to the fact that the curvature of the emitting surface 902 equates to about one-quarter of a circle with the same radius.) A pair of opaque sidewalls 904, 906 cant inwardly from side edges of the emitting surface 902. At ends away from the emitting surface 902, the sidewalls 904, 806 turn inward, defining a shorter fourth side 908 generally parallel to the emitting surface 902. The fourth side 908 is open and has receiving structures 910, 912 that define a slot for receiving a PCB 914 with LED light engines 915 disposed on it.

In the embodiment of FIG. 20, the PCB 914 may be assumed to be one of the same PCBs 32, 710 described above, but it need not be. In particular, the PCB 914 may operate at either low voltage or high voltage. Like the PCBs 32, 710 described above, the PCB 914 is narrow, rigid and closes the luminaire 900 along the fourth side 808. Like the PCBs 32, 710 described above, the PCB 914 has staggered connectors 916, 918 for making electrical connections. With the arrangement shown in FIG. 20, the LED light engines 915 on the PCB 914, emit toward the emitting surface 902.

Luminaires 800, 900 with more complex cross-sectional shapes may provide various advantages. For one, these kinds of shapes can be used to emulate more traditional or legacy light sources or diffusers. Additionally, luminaires 800, 900 with more complex cross-sectional shapes may have more internal volume than a comparable luminaire 10, and potentially, more distance between the PCB 814, 814 and the emitting surface 802, 902 than in other embodiments. This may provide more potential for light diffusion. The embodiments 10, 100 described above deal with the problem of diffusion by packing LED light engines 34 at a close pitch on the PCB; in luminaires 800, 900 with more internal volume and more distance between the PCB 814, 914 and the emitting surface 802, 902, it may not be necessary to use as tight of a pitch with the LED light engines 815, 915.

This description uses the term "about." That term is meant to signify that the value or range of values to which it refers may change, so long as the described effect or result does not change. If it cannot be determined what value or range of values would not cause the described effect or result to change, then the term "about" should be construed to mean ±10%.

All AC voltages referenced in this description are root-mean-square voltages. Therefore, as those of skill in the art will appreciate, the actual peak voltages will be higher and lower than what is described.

While the invention has been described with respect to certain embodiments, the description is intended to be exemplary, rather than limiting. Modifications and changes may be made within the scope of the invention, which is defined by the appended claims.

What is claimed is:

1. A linear luminaire, comprising:

an elongate, three-sided enclosure with a top and a pair of depending sidewalls spaced apart by the top, the three-sided enclosure having a constant cross-sectional shape over its length, the top of the enclosure being translucent, the enclosure being open along an open side opposite the top;

a rigid printed circuit board (PCB) with light-emitting diode (LED) light engines installed in a slot defined between the pair of depending sidewalls such that, when installed, the PCB closes at least a portion of the three-sided enclosure along the open fourth side, the PCB oriented such that light from the LED light engines is emitted from the top;

engaging structure along respective inner faces of each of the pair of sidewalls below the slot in which the PCB is installed; and a mounting clip having engaging structure complementary to the engaging structure of the inner faces of each of the pair of sidewalls, the mounting clip, or a bracket engaged with the mounting clip, including an extension that, when the mounting clip is installed in the three-sided enclosure, extends along or parallel to a long axis of the three-sided enclosure, terminating proximate to an end of the three-sided enclosure, mounting structure at the end of the extension, and an endcap adapted to be received in and secured by the mounting structure to cover an end of the three-sided enclosure.

2. The linear luminaire of claim 1, wherein the three-sided enclosure is extruded from a plastic or co-extruded from a first plastic that is at least translucent and a second plastic that is opaque.

3. The linear luminaire of claim 1, wherein the pair of depending sidewalls of the three-sided enclosure are opaque.

4. The linear luminaire of claim 1, wherein outer faces of the pair of sidewalls are roughened or barbed.

5. The linear luminaire of claim 1, wherein the three-sided enclosure is made of a resilient material and the pair of sidewalls are canted outwardly as they depend from the top.

6. A linear luminaire, comprising:

a channel having a first compartment and a second compartment, the second compartment having engaging structure;

one or more strips of linear lighting disposed in the first compartment;

a mounting clip adapted to be mounted in the second compartment, the mounting clip including a floor and a pair of upwardly-extending sides spaced apart by the floor, each of the pair of sides having engaging structure adapted to engage the second compartment, an extension that extends away from an end of the mounting clip such that, when the mounting clip is installed in the second compartment, a long axis of the extension extends along or parallel to a long axis of the channel, the extension terminating proximate to an end of the channel, and mounting structure at the end of the extension; and an endcap adapted to be received in and secured by the mounting structure to cover the end of at least the first compartment of the channel.

7. The linear luminaire of claim 6, wherein the mounting clip further comprises at least one opening for a fastener in the floor thereof.

8. The linear luminaire of claim 6, wherein the first and second compartments are opposed to one another on opposite sides of a separating member.

9. The linear luminaire of claim 8, wherein the separating member comprises a floor of the first compartment.

10. The linear luminaire of claim 6, wherein the endcap carries structure to engage the end face of at least the first compartment.

11. The linear luminaire of claim 6, wherein the endcap is sized and adapted to cover the end of the first compartment and the second compartment.

12. The linear luminaire of claim 6, wherein the mounting structure at the end of the extension comprises:

a connecting portion of or connected to the extension that extends at essentially a right angle to the extension;

an engaging structure provided in the connecting portion.

13. The linear luminaire of claim 12, wherein the engaging structure comprises an opening in the connecting portion.

14. The linear luminaire of claim 13, wherein the endcap further comprises a projection extending from an inner surface of the endcap, the projection sized and arranged to engage the opening in the connecting portion.

15. The linear luminaire of claim 14, wherein the endcap or the engaging structure comprises shaped or keyed structure adapted to restrict rotation of the endcap.

16. The linear luminaire of claim 15, wherein the shaped or keyed structure comprises a three-sided raised border or slot on the inner surface of the endcap, substantially surrounding the projection.

17. The linear luminaire of claim 6, wherein the endcap carries seating structure extending generally horizontally from an inner surface thereof, the seating structure having one or both of a shape or features corresponding to a shape or features of the first compartment and adapted to seat the endcap against the first compartment.

18. The linear luminaire of claim 6, further comprising a bracket adapted to engage and be carried by the mounting clip;

wherein the extension comprises a portion of the bracket.

19. The linear luminaire of claim 18, wherein the bracket is configured and adapted to be carried within a slot defined in the pair of sides of the mounting clip, above the floor of the mounting clip.

20. The linear luminaire of claim 6, wherein the mounting structure descends below a level of a body of the bracket.

* * * * *